(12) United States Patent
Brock et al.

(10) Patent No.: US 11,261,969 B2
(45) Date of Patent: Mar. 1, 2022

(54) SEALING MEMBER WITH INTEGRALLY FORMED RIBS

(71) Applicant: DANA AUTOMOTIVE SYSTEMS GROUP, LLC, Maumee, OH (US)

(72) Inventors: David A. Brock, Swanton, OH (US); Stephen J. Carr, Dundee, MI (US); Cody P. Jennings, Maumee, OH (US)

(73) Assignee: Dana Automotive Systems Group, LLC, Maumee, OH (US)

( * ) Notice: Subject to any disclaimer, the term of this patent is extended or adjusted under 35 U.S.C. 154(b) by 333 days.

(21) Appl. No.: 16/603,302

(22) PCT Filed: Apr. 6, 2018

(86) PCT No.: PCT/US2018/026421
§ 371 (c)(1),
(2) Date: Oct. 7, 2019

(87) PCT Pub. No.: WO2018/187666
PCT Pub. Date: Oct. 11, 2018

(65) Prior Publication Data
US 2021/0108729 A1     Apr. 15, 2021

Related U.S. Application Data

(60) Provisional application No. 62/483,052, filed on Apr. 7, 2017.

(51) Int. Cl.
*F16J 15/3252*     (2016.01)
(52) U.S. Cl.
CPC ................................ *F16J 15/3252* (2013.01)

(58) Field of Classification Search
CPC ............................... F16J 15/3252; F16J 15/32
See application file for complete search history.

(56) References Cited

U.S. PATENT DOCUMENTS 3,913,924 A * 10/1975 Barefoot ............. F16C 33/7813
277/574
4,114,245 A *  9/1978 Bainard ................... B23P 15/00
264/135

(Continued)

FOREIGN PATENT DOCUMENTS

JP         08278319 A  * 10/1996  .......... F16C 33/7853

*Primary Examiner* — Eugene G Byrd
(74) *Attorney, Agent, or Firm* — Marshall & Melhorn, LLC

(57) ABSTRACT

A sealing assembly having a seal casing. A decreased diameter portion extends inboard from at least a portion of a first end portion of the substantially cylindrical portion and an axially extending portion extends inboard from at least a portion of a second end portion of the decreased diameter portion of the casing. One or more first sealing portions having one or more static sealing ribs extend from at least a portion of an outer surface of the substantially cylindrical portion. One or more second sealing portions are integrally connected to at least a portion of the decreased diameter portion, the axially extending portion and/or an inner surface of the substantially cylindrical portion. The one or more second sealing portions have a retaining member sealing surface with one or more sealing member retention ribs extending from at least a portion of an outer surface of the retaining member sealing surface.

18 Claims, 6 Drawing Sheets

(56) References Cited

U.S. PATENT DOCUMENTS

| | | | |
|---|---|---|---|
| 4,208,057 A * | 6/1980 | Messenger | F16J 15/3264 |
| | | | 277/309 |
| 4,856,794 A | 8/1989 | Boyers | |
| 5,292,199 A | 3/1994 | Hosbach | |
| 5,649,709 A | 7/1997 | Munekata | |
| 5,722,664 A | 3/1998 | Otto | |
| 5,992,595 A | 11/1999 | Adachi | |
| 6,017,037 A | 1/2000 | Fedorovich | |
| 6,158,743 A | 12/2000 | Anderson | |
| 6,170,833 B1 | 1/2001 | Cox | |
| 8,016,293 B2 * | 9/2011 | Voydatch | F16J 15/164 |
| | | | 277/551 |
| 8,366,324 B2 | 2/2013 | Takimoto | |
| 9,739,285 B2 | 8/2017 | Kosmicki | |
| 9,751,361 B2 * | 9/2017 | Seki | F16C 41/007 |
| 10,352,451 B2 * | 7/2019 | Kamiya | F16J 15/3208 |
| 2010/0270751 A1 | 10/2010 | Loe | |
| 2012/0313328 A1 | 12/2012 | Larson | |
| 2017/0122438 A1 * | 5/2017 | Hamamoto | F16J 15/3244 |

* cited by examiner

SECTION A-A

SEALING MEMBER WITH INTEGRALLY FORMED RIBS

CROSS-REFERENCE TO RELATED APPLICATIONS

The present application claims the benefit to U.S. Provisional Patent Application No. 62/483,052 filed on Apr. 7, 2017, which is incorporated herein by reference in its entirety.

FIELD OF THE DISCLOSURE

The present disclosure relates to sealing members having one or more integrally formed ribs.

BACKGROUND OF THE DISCLOSURE

Conventional sealing members for use with a shaft suffer from a variety of issues that negatively affect their overall life and durability. In particular, during the assembly process the sealing members are allowed to freely float on the outer surface of the shaft. As a result, the sealing members tend to be pinched or squeezed against an outer surface of the shaft by one or more nearby components during the transport and/or assembly process. This causes an undesirable amount of damage to the sealing member and therefore reduces the overall life and durability of the sealing member which results in a high degree of warranty claims. This increase in the overall amount of warranty claims resulting from one or more sealing member failures increases the overall costs associated with the sealing member.

It would therefore be advantageous to develop a sealing member and/or a sealing member assembly that is more robust in its design and aids in decreasing the overall warranty claims and costs associated with the sealing member. Additionally, it would be advantageous to develop a sealing member and/or a sealing member assembly that prevents the sealing member from being pinched or squeezed against the outer surface of a shaft thereby providing a sealing member and/or sealing member assembly having an increased life and durability.

SUMMARY OF THE DISCLOSURE

A sealing assembly having one or more sealing members and a seal casing. The seal casing has a substantially cylindrical portion with a first end portion, a second end portion, an inner surface and an outer surface. Extending radially inboard from at least a portions the first end portion of the substantially cylindrical portion is a decreased diameter portion having a first end portion and a second end portion. An axially extending portion extends inboard from at least a portion of the second end portion of the decreased diameter portion of the seal casing. One or more first sealing portions having one or more static sealing ribs are integrally connected to and extend from at least a portion of the outer surface of the substantially cylindrical portion of the seal casing. Additionally, one or more second sealing portions are integrally connected to at least a portion of the decreased diameter portion, the axially extending portion and/or the inner surface of the substantially cylindrical portion. The one or more second sealing portions have a retaining member sealing surface with one or more sealing member retention ribs extending from at least a portion of an outer surface of the retaining member sealing surface.

According to an aspect of the disclosure, the one or more second sealing portions may further include one or more first axially extending sealing lips having a first end portion and a second end portion. The one or more first axially extending sealing lips circumferentially extend outboard from at least a portion of the first end portion of the retaining member sealing surface. Additionally, the one or more first axially extending sealing lips may have an outermost diameter OD2 that is larger than an outer diameter OD1 of the first end portion of the retaining member sealing surface.

According to any of the previous aspects of the disclosure, the one or more second sealing portions may further include one or more second axially extending sealing lips. The one or more second axially extending sealing lips circumferentially extend axially inboard from at least a portion of an inner surface of the one or more second sealing portions of the one or more sealing members. A spring groove may circumferentially extend along at least a portion of an outer surface of the one or more second axially extending sealing lips. The spring groove has a size and shape to receive and/or retain at least a portion of a spring member.

According to any of the previous aspects of the disclosure, the spring member may be a garter spring.

According to any of the previous aspects of the disclosure, the one or more second sealing portions may further include one or more radially extending sealing lips. The one or more radially extending sealing lips extend inboard from at least a portion of the inner surface of the one or more second sealing portions of the one or more sealing members.

According to any of the previous aspects of the disclosure, the seal casing may have a substantially chair-shaped cross-sectional shape.

According to any of the previous aspects of the disclosure, the decreased diameter portion may be substantially disk-shaped and the decreased diameter portion may extend radially inboard from and substantially perpendicular to the substantially cylindrical portion of the seal casing.

According to any of the previous aspects of the disclosure, the axially extending portion may have a diameter that decreases from the first end portion to the first end portion of the axially extending portion. The diameter of the axially extending portion may decrease at a substantially constant rate or a variable rate from the first end portion to the second end portion of the axially extending portion of the seal casing.

According to any of the previous aspects of the disclosure, the sealing assembly may further include a shaft and a housing. The housing may have a first end portion, a second end portion, an inner surface and an outer surface, where the inner surface and the outer surface of the housing defines a hollow portion therein. The shaft may have a first end portion, a second end portion and an outer surface where, at least a portion of the shaft is disposed within the hollow portion of the housing. At least a portion of the one or more second axially extending sealing lips and/or the one or more radially extending sealing lips may be sealingly engaged with at least a portion of the outer surface of the shaft and at least a portion of the one or more static sealing ribs may be sealingly engaged with at least a portion of the inner surface of the first end portion of the housing.

According to any of the previous aspects of the disclosure, the shaft may be an axle half shaft.

According to any of the previous aspects of the disclosure, the sealing assembly may further include one or more retaining members having an axially outboard surface and an axially inboard surface. At least a portion of the one or more retaining members are integrally connected to at least a proton of the first end proton of the housing. The one or more retaining members may include one or more sealing member apertures that extend from the axially inboard surface to the axially outboard surface of the one or more retaining members and are oriented about a centerline C1 of the one or more retaining members. At least a portion of a surface defining the one or more sealing member apertures in the one or more retaining members elastically deforms at least a portion of the one or more sealing member retention ribs in order to retain at least a portion of the one or more one or more sealing members within the one or more sealing member apertures.

According to any of the previous aspects of the disclosure, the one or more sealing member retention ribs may have an outermost diameter OD4 that is substantially equal to or larger than a diameter D1 of the one or more sealing member apertures of the one or more retaining members. A radially outboard surface of the one or more sealing member retention ribs may have an under-cut portion.

According to any of the previous aspects of the disclosure, the under-cut portion of the one or more sealing member retention ribs may have a substantially flat shape.

According to any of the previous aspects of the disclosure, the one or more sealing member retention ribs may have an outermost surface having a substantially spherical shape with a radius of curvature R1. Additionally, the one or more sealing member retention ribs may have an outermost diameter OD5 that is substantially equal to or larger than the diameter D1 of the one or more sealing member apertures of the one or more retaining members. At least a portion of the surface defining the one or more sealing member apertures in the one or more retaining members elastically deforms at least a portion of the substantially spherical outermost surface of the one or more sealing member retention ribs in order to retain at least a portion of the one or more one or more sealing members within the one or more sealing member apertures.

According to any of the previous aspects of the disclosure, the one or more sealing member retention ribs may have a retaining member groove circumferentially extending along at least a portion of a radially outboard surface of the one or more sealing member retention ribs. The retaining member groove may have a size and shape to receive and/or retain at least a portion of the one or more retaining members. At least a portion of the surface defining the one or more sealing member apertures in the one or more retaining members elastically deforms at least a portion of a retention lip of the retaining member groove in the one or more sealing member retention ribs in order to retain at least a portion of the one or more retaining members within the retaining member groove of the one or more sealing member retention ribs.

According to any of the previous aspects of the disclosure, the one or more sealing member retention ribs may have a radially outboard surface that is substantially flat or substantially cylindrical in shape. The substantially flat or substantially cylindrical radially outboard surface of the one or more sealing member retention ribs may have an outermost diameter OD7 that is substantially equal to or larger than the diameter D1 of the one or more sealing member apertures of the one or more retaining members. At least a portion of the surface defining the one or more sealing member apertures in the one or more retaining members elastically deforms at least a portion of the substantially flat or substantially cylindrical radially outboard surface of the one or more sealing member retention ribs in order to retain at least a portion of the one or more one or more sealing members within the one or more sealing member apertures.

According to any of the previous aspects of the disclosure, the sealing assembly may further include a slinger having a substantially cylindrical portion with an inner surface and an outer surface. At least a portion of the inner surface of the substantially cylindrical portion of the slinger may be integrally connected to at least a portion of the outer surface of the shaft. Circumferentially extending outboard from at least a portion of the outer surface of the substantially cylindrical portion of the slinger is an increased diameter portion having a first side and a second side. At least a portion of the first end portion of the one or more first axially extending sealing lips of the one or more sealing members are in direct contact with and sealingly engaged with at least a portion of the second side of the increased diameter portion of the slinger.

According to any of the previous aspects of the disclosure, the sealing assembly may further include one or more bearing assemblies having one or more sealing member contact portions. At least a portion of the second end portion of the substantially cylindrical portion of the seal casing of the one or more sealing members may be in direct contact with at least a portion of the one or more sealing member contact portions of the one or more dealing assemblies. The substantially cylindrical portion of the seal casing of the one or more sealing members may apply an amount of pre-loading force onto the one or more bearing assemblies.

BRIEF DESCRIPTION OF THE DRAWINGS

The above, as well as other advantages of the present disclosure, will become readily apparent to those skilled in the art from the following detailed description when considered in light of the accompanying drawings in which.

DETAILED DESCRIPTION OF THE DISCLOSURE

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions, directions or other physical characteristics relating to the embodiments disclosed are not to be considered as limiting, unless the claims expressly state otherwise.

It is within the scope of this disclosure, and as a non-limiting example, that the sealing member with integral protruding ribs disclosed herein may be used in automotive, off-road vehicle, all-terrain vehicle, construction, structural, marine, aerospace, locomotive, military, machinery, robotic and/or consumer product applications. Additionally, as a non-limiting example, the sealing member with integral protruding ribs disclosed herein may also be used in passenger vehicle, electric vehicle, hybrid vehicle, commercial vehicle, military, autonomous vehicles, semi-autonomous vehicles and/or heavy vehicle applications.

Figure 1:
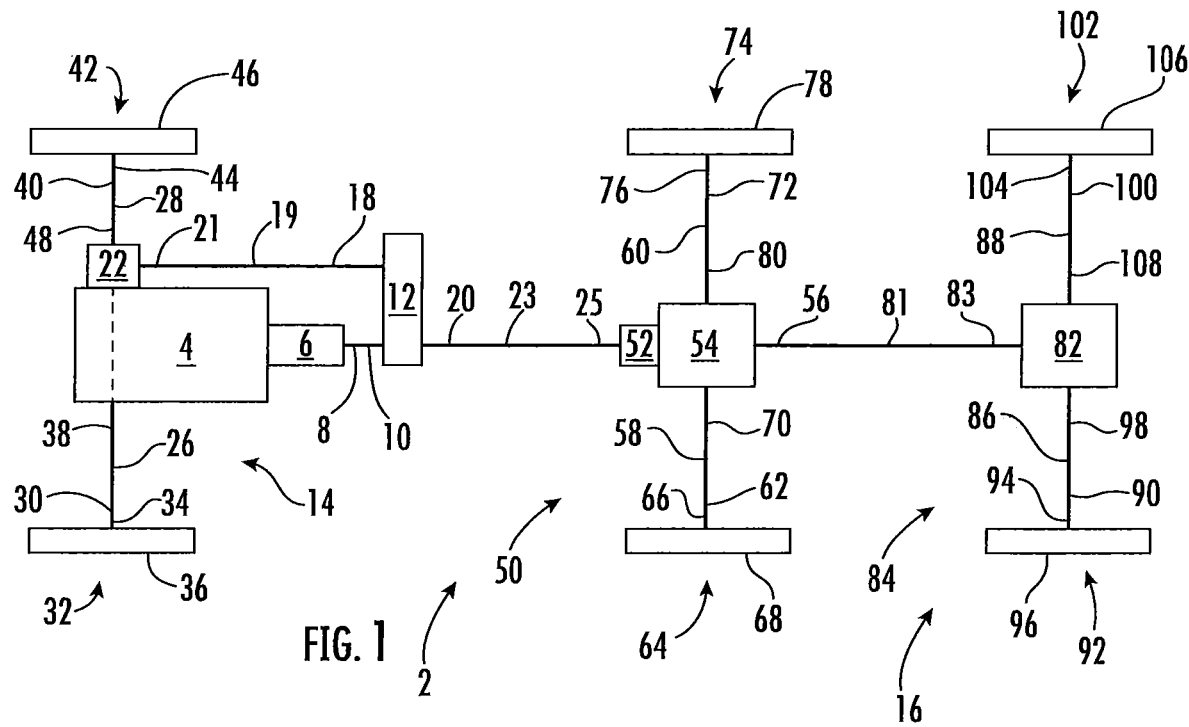
FIG. 1 is a schematic top-plan view of a vehicle having one or more sealing assemblies according to an embodiment of the disclosure.

FIG. 1 is a schematic top-plan view of a vehicle 2 having one or more sealing assemblies according to an embodiment of the disclosure. The vehicle 2 has an engine 4 which is drivingly connected to a transmission 6. A transmission output shaft 8 is then drivingly connected to an end of the transmission 6 opposite the engine 4. The transmission 6 is a power management system which provides controlled application of the rotational power generated by the engine 4 by means of a gear box.

The transmission output shaft 8 is drivingly connected to a transfer case input shaft 10 which in turn is drivingly connected to a transfer case 12. The transfer case 12 is used to transfer the rotational power from the transmission 6 to a front axle system 14 and/or a tandem axle system 16 by utilizing a series of gears and drive shafts. As illustrated in FIG. 1 of the disclosure and as a non-limiting example, the transfer case 12 includes a first transfer case output shaft 18 and a second transfer case output shaft 20.

A first shaft 19 extends from an end of the first transfer case output shaft 18, opposite the transmission case 12, toward the front axle system 14 of the vehicle 2. The first shaft 19 transmits the rotational from the transfer case 12 to the front axle system 14 of the vehicle 2 thereby drivingly connecting the transfer case 12 to the front axle system 14. It is within the scope of this disclosure and as a non-limiting example that the first shaft 19 may be a drive shaft, a prop shaft or a Cardan shaft.

Drivingly connected to an end of the first shaft 19, opposite the first transfer case output shaft 18, is a front axle system input shaft 21. The front axle system input shaft 21 drivingly connects the first shaft 19 of the vehicle 2 to a front axle differential assembly 22. In accordance with the embodiment of the disclosure illustrated in FIG. 1 and as a non-limiting example, an end of the front axle system input shaft 21, opposite the first shaft 19, is drivingly connected to at least a portion of the front axle differential assembly 22. It is within the scope of this disclosure and as a non-limiting example that the front axle system input shaft 21 may be a front differential input shaft, a coupling shaft, stub shaft or a front differential pinion shaft. The front axle differential assembly 22 is a set of gears that allows the outer drive wheel(s) of the vehicle 2 to rotate at a faster rate that the inner drive wheel(s). The rotational power is transmitted through the front axle system 14 as described in more detail below.

The front axle system 14 further includes a first front axle half shaft 26 and a second front axle half shaft 28. The first front axle half shaft 26 extends substantially perpendicular to the front axle system input shaft 21. A first end portion 30 of the first front axle half shaft 26 is drivingly connected to a first front axle wheel end assembly 32. The first front axle wheel end assembly 32 includes a first front axle sealing assembly 34 and a first front axle wheel assembly 36. A second end portion 38 of the first front axle half shaft 26 is drivingly connected to an end of the front axle differential 22. As a non-limiting example, the second end portion 38 of the first front axle half shaft 26 is drivingly connected to a front axle differential side gear, a separate stub shaft, a separate coupling shaft, a first front axle half shaft axle disconnect system, a first front axle differential output shaft and/or a shaft that is formed as part of a front axle differential side gear.

Extending substantially perpendicular to the front axle system input shaft 21 is the second front axle half shaft 28. A first end portion 40 of the second front axle half shaft 28 is drivingly connected to a second front axle wheel end assembly 36. The second front axle wheel end assembly 36 includes a second front axle sealing assembly 44 and a second front axle wheel assembly 46. A second end portion 48 of the second front axle half shaft 28 is drivingly connected to an end of the front axle differential 22 opposite the first front axle half shaft 26. As a non-limiting example, the second end portion 48 of the second front axle half shaft 28 is drivingly connected to a front axle differential side gear, a separate stub shaft, a separate coupling shaft, a second front axle half shaft axle disconnect system, a second front axle differential output shaft and/or a shaft that is formed as part of a front axle differential side gear.

A second shaft 23 extends from an end of the second transfer case output shaft 20, opposite the transfer case 12, toward a forward tandem axle system 50 of the tandem axle system 16 having an inter-axle differential 52. The second shaft 23 transmits the rotational power from the transfer case 12 to the forward tandem axle system 50 of the vehicle 2. It is within the scope of this disclosure and as a non-limiting example that the second shaft 23 may be a drive shaft, a propeller shaft or a Cardan shaft.

As illustrated in FIG. 1 of the disclosure and as a non-limiting example, a forward tandem axle system input shaft 25 is drivingly connected to an end of the second shaft 23 opposite the second transfer case output shaft 20. At least a portion of an end of the forward tandem axle system input shaft 25, opposite the second shaft 23, is drivingly connected to at least a portion of the inter-axle differential 52. The inter-axle differential 52 is a device that divides the rotational power generated by the engine 4 between the axles in a vehicle 2. The rotational power is transmitted through the forward tandem axle system 50 as described in more detail below.

In accordance with the embodiment illustrated in FIG. 1 and as a non-limiting example, the inter-axle differential 52 is drivingly connected to a forward tandem axle differential 54 and a forward tandem axle system output shaft 56. The forward tandem axle differential 54 is a set of gears that allows the outer drive wheel(s) of a wheeled vehicle 2 to rotate at a faster rate than the inner drive wheel(s).

The forward tandem axle system 50 further includes a first forward tandem axle half shaft 58 and a second forward tandem axle half shaft 60. The first forward tandem axle half shaft 58 extends substantially perpendicular to forward tandem axle system input shaft 25. A first end portion 62 of the first forward tandem axle half shaft 58 is drivingly connected to a first forward tandem axle wheel end assembly 64. The first forward tandem axle wheel end assembly 64 includes a first forward tandem axle sealing assembly 66 and a first forward tandem axle wheel assembly 89. A second end portion 70 of the first forward tandem axle half shaft 58 is drivingly connected to an end of the forward tandem axle differential 54. As a non-limiting example, the second end portion 70 of the first forward tandem axle half shaft 58 is drivingly connected to a forward tandem axle differential side gear, a separate stub shaft, a separate coupling shaft, a first forward tandem axle half shaft axle disconnect system, a first forward tandem axle differential output shaft and/or a shaft that is formed as part of a forward tandem axle differential side gear.

Extending substantially perpendicular to the forward tandem axle system input shaft 25 is the second forward tandem axle half shaft 60. A first end portion 72 of the second forward tandem axle half shaft 60 is drivingly connected to a second forward tandem axle wheel end assembly 74. The second forward tandem axle wheel end assembly 74 includes a second forward tandem axle sealing assembly 76 and a second forward tandem axle wheel assembly 78. A second end portion 80 of the second forward tandem axle half shaft 60 is drivingly connected to an end of the forward tandem axle differential 54 opposite the first forward tandem axle half shaft 58. As a non-limiting example, the second end portion 80 of the second forward tandem axle half shaft 60 is drivingly connected to a forward tandem axle differential side gear, a separate stub shaft, a separate coupling shaft, a second forward tandem axle half shaft axle disconnect system, a second forward tandem axle differential output shaft and/or a shaft that is formed as part of a forward tandem axle differential side gear.

One end of the forward tandem axle system output shaft 56 is drivingly connected to a side of the inter-axle differential 52 opposite the first propeller shaft 24. The forward tandem axle system output shaft 56 extends from the forward tandem axle system 50 toward a rear tandem axle system 84.

An end of the forward tandem axle system output shaft 56, opposite the inter-axle differential 52, is a third shaft 81. The third shaft 81 extends from the forward tandem axle system output shaft 56 toward the rear tandem axle system 84. The third shaft 81 transmits the rotational power from the transfer case 12 to the rear tandem axle system 84 of the vehicle 2. It is within the scope of this disclosure and as a non-limiting example that the third shaft 81 may be a drive shaft, a propeller shaft or a Cardan shaft.

Drivingly connected to an end of the third shaft 81, opposite the forward tandem axle system output shaft 56, is a rear tandem axle system input shaft 83. As a result, the rear tandem axle system input shaft 83 drivingly connects the transfer case 12 to a rear tandem axle differential 82 of the rear tandem axle system 84 of the vehicle 2. The rear tandem axle differential 82 is a set of gears that allows the outer drive wheel(s) of a wheeled vehicle 2 to rotate at a faster rate than the inner drive wheel(s). The rotational power is transmitted through the rear tandem axle system 84 as described in more detail below.

The rear tandem axle system 84 further includes a first rear tandem axle half shaft 86 and a second rear tandem axle half shaft 88. The first rear tandem axle half shaft 86 extends substantially perpendicular to rear tandem axle system input shaft 83. A first end portion 90 of the first rear tandem axle half shaft 86 is drivingly connected to a first rear tandem axle wheel end assembly 92. The first rear tandem axle wheel end assembly 92 includes a first rear tandem axle sealing assembly 94 and a first rear tandem axle wheel assembly 96. A second end portion 98 of the first rear tandem axle half shaft 86 is drivingly connected to an end of the rear tandem axle differential 82. As a non-limiting example, the second end portion 98 of the first rear tandem axle half shaft 86 is drivingly connected to a rear tandem axle differential side gear, a separate stub shaft, a separate coupling shaft, a first rear tandem axle half shaft axle disconnect system, a first rear tandem axle differential output shaft and/or a shaft that is formed as part of a rear tandem axle differential side gear.

Extending substantially perpendicular to the rear tandem axle system input shaft 83 is the second rear tandem axle half shaft 88. A first end portion 100 of the second rear tandem axle half shaft 88 is drivingly connected to a second rear tandem axle wheel end assembly 102. The second rear tandem axle wheel end assembly 102 includes a second rear tandem axle sealing assembly 104 and a second rear tandem axle wheel assembly 106. A second end portion 108 of the second rear tandem axle half shaft 88 is drivingly connected to an end of the rear tandem axle differential 82 opposite the first rear tandem axle half shaft 86. As a non-limiting example, the second end portion 108 of the second rear tandem axle half shaft 88 is drivingly connected to a rear tandem axle differential side gear, a separate stub shaft, a separate coupling shaft, a second rear tandem axle half shaft axle disconnect system, a second rear tandem axle differential output shaft and/or a shaft that is formed as part of a rear tandem axle differential side gear.

It is within the scope of this disclosure that one or more of the sealing assemblies 34, 44, 66, 76, 94 and/or 104 may include the use of a sealing assembly according to an embodiment of the disclosure.

Figure 2:
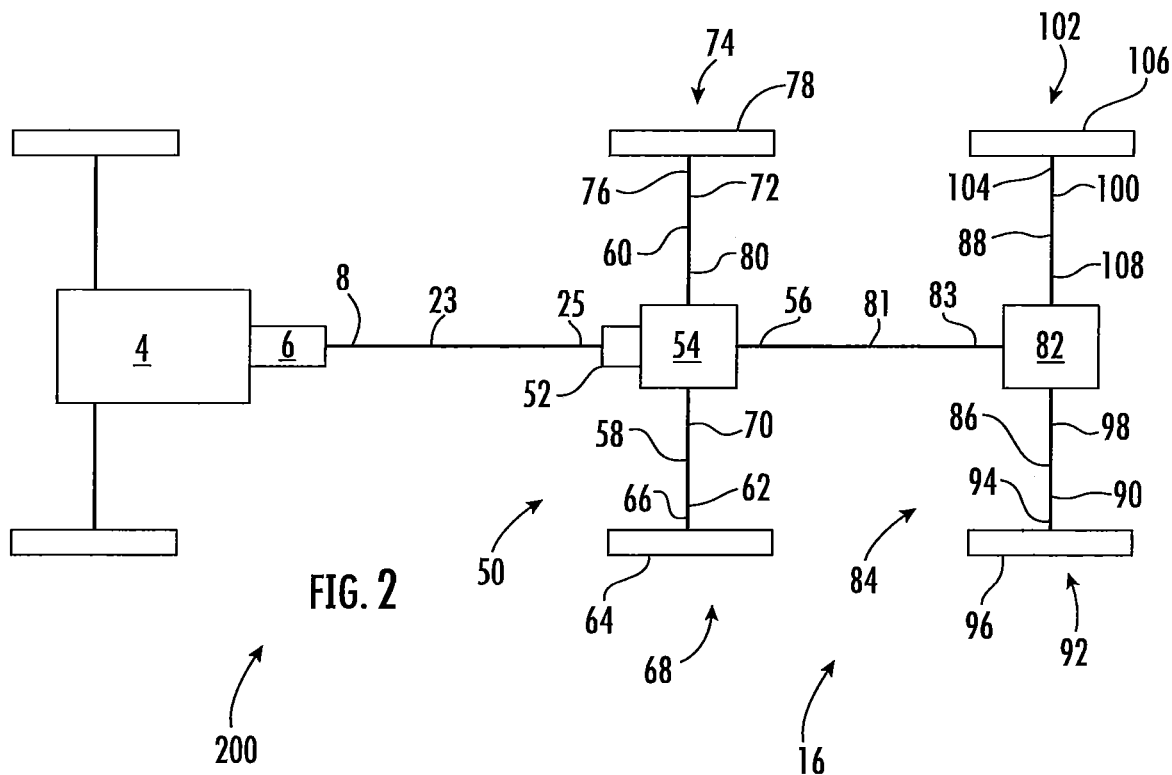
FIG. 2 is a schematic top-plan view of another vehicle having one or more sealing assemblies according to an embodiment of the disclosure.

FIG. 2 is a schematic top-plan view of another vehicle 200 having one or more sealing assemblies according to an embodiment of the disclosure. The vehicle 200 illustrated in FIG. 2 is the same as the vehicle 2 illustrated in FIG. 1, except where specifically noted below. As illustrated in FIG. 2 and as a non-limiting example, the vehicle 200 does not include the use of the transfer case 12 that drivingly connects the transmission 6 to the front axle differential assembly 20 of the front axle system 14.

In accordance with the embodiment of the disclosure illustrated in FIG. 2 and as a non-limiting example, at least a portion of the end of the transmission output shaft 8, opposite the transmission 6, is drivingly connected to at least a portion of an end of the first propeller shaft 24 opposite the inter-axle differential 52. As a result, in accordance with the embodiment of the disclosure illustrated in FIG. 2 and as a non-limiting example, the second shaft 150 of the vehicle 200 extends from the transmission output shaft 106 toward the rear axle system 114 of the vehicle 200.

It is within the scope of this disclosure that one or more of the sealing assemblies 66, 76, 94 and/or 104 may include the use of a sealing assembly according to an embodiment of the disclosure.

Figure 3:
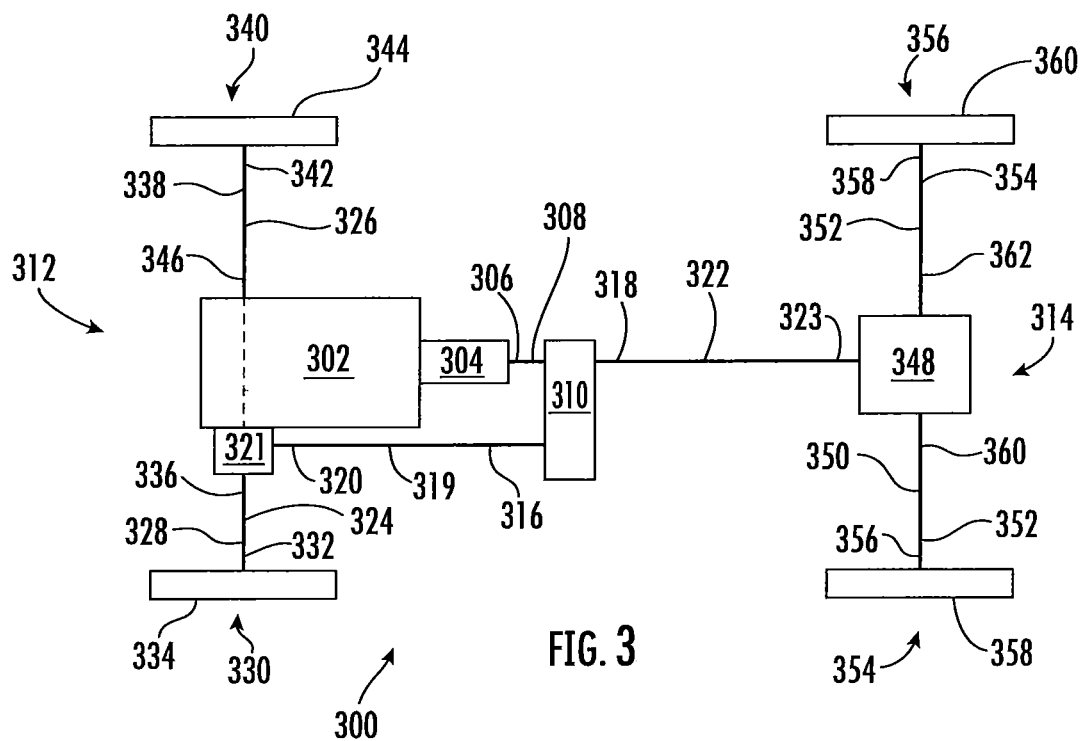
FIG. 3 is a schematic top-plan view of yet another vehicle having one or more sealing assemblies according to an embodiment of the disclosure.

FIG. 3 is a schematic top-plan view of yet another vehicle 300 having one or more sealing assemblies according to an embodiment of the disclosure. The vehicle 300 has an engine 302 which is drivingly connected to a transmission 304. A transmission output shaft 306 is then drivingly connected to an end of the transmission 304 opposite the engine 302. The transmission 304 is a power management system which provides controlled application of the rotational power generated by the engine 302 by means of a gear box.

The transmission output shaft 306 is drivingly connected to a transfer case input shaft 308 which in turn is drivingly connected to a transfer case 310. The transfer case 310 is used in four-wheel drive and/or all-wheel-drive (AWD) vehicles to transfer the rotational power from the transmission 304 to a front axle system 312 and/or a rear axle system 314 by utilizing a series of gears and drive shafts. Additionally, the transfer case 310 allows the vehicle 300 to selectively operate in either a two-wheel drive mode or a four-wheel/AWD drive mode. As illustrated in FIG. 3 of the disclosure and as a non-limiting example, the transfer case 310 includes a first transfer case output shaft 316 and a second transfer case output shaft 318.

Drivingly connected to an end of the first transfer case output shaft 316, opposite the transfer case 310, is a first shaft 319. The first shaft 319 extends from the first transfer case output shaft 316 toward the front axle system 312 of the vehicle 300. Additionally, the first shaft 319 transmits the rotational from the transfer case 310 to the front axle system 312 of the vehicle 300 thereby drivingly connecting the transfer case 310 to the front axle system 312. It is within the scope of this disclosure and as a non-limiting example that the first shaft 319 may be a drive shaft, a prop shaft or a Cardan shaft.

Drivingly connected to an end of the first shaft 319, opposite the first transfer case output shaft 316, is a front axle system input shaft 320. The front axle system input shaft 320 drivingly connects the first shaft 319 of the vehicle 300 to a front axle differential assembly 321. In accordance with the embodiment of the disclosure illustrated in FIG. 3 and as a non-limiting example, an end of the front axle system input shaft 320, opposite the first shaft 319, is drivingly connected to at least a portion of the front axle differential assembly 321. The front axle differential assembly 321 is a set of gears that allows the outer drive wheel(s) of the vehicle 300 to rotate at a faster rate that the inner drive wheel(s). The rotational power is transmitted through the front axle system 312 as described in more detail below.

The front axle system 312 further includes a first front axle half shaft 324 and a second front axle half shaft 326. The first front axle half shaft 324 extends substantially perpendicular to the front axle system input shaft 320. A first end portion 328 of the first front axle half shaft 324 is drivingly connected to a first front axle wheel end assembly 330. The first front axle wheel end assembly 330 includes a first front axle sealing assembly 332 and a first front axle wheel assembly 334. A second end portion 336 of the first front axle half shaft 324 is drivingly connected to an end of the front axle differential 321. As a non-limiting example, the second end portion 336 of the first front axle half shaft 324 is drivingly connected to a front axle differential side gear, a separate stub shaft, a separate coupling shaft, a first front axle half shaft axle disconnect system, a first front axle differential output shaft and/or a shaft that is formed as part of a front axle differential side gear.

Extending substantially perpendicular to the front axle system input shaft 320 is the second front axle half shaft 326. A first end portion 338 of the second front axle half shaft 326 is drivingly connected to a second front axle wheel end assembly 340. The second front axle wheel end assembly 340 includes a second front axle sealing assembly 342 and a second front axle wheel assembly 344. A second end portion 346 of the second front axle half shaft 326 is drivingly connected to an end of the front axle differential 321 opposite the first front axle half shaft 324. As a non-limiting example, the second end portion 346 of the second front axle half shaft 326 is drivingly connected to a front axle differential side gear, a separate stub shaft, a separate coupling shaft, a second front axle half shaft axle disconnect system, a second front axle differential output shaft and/or a shaft that is formed as part of a front axle differential side gear.

A second shaft 322 extends from the second transfer case output shaft 318 toward the rear axle system 314 of the vehicle 300 having a rear axle differential 348. The second shaft 322 transmits the rotational power from the transfer case 310 to the rear axle system 314 of the vehicle 300. It is within the scope of this disclosure and as a non-limiting example that the second shaft 322 may be a drive shaft, a propeller shaft or a Cardan shaft.

In accordance with the embodiment of the disclosure illustrated in FIG. 3 and as a non-limiting example, a rear axle system input shaft 323 is drivingly connected to an end of the second shaft 322 opposite the second transfer case output shaft 318 of the vehicle 300. At least a portion of an end of the rear axle system input shaft 323, opposite the second shaft 322, is drivingly connected to at least a portion of the rear axle differential 348. The rear axle differential 348 is a set of gears that allows the outer drive wheel(s) of a wheeled vehicle 300 to rotate at a faster rate than the inner drive wheel(s). The rotational power is transmitted through the rear axle system 314 as described in more detail below.

The rear axle system 314 further includes a first rear axle half shaft 350 and a second rear axle half shaft 352. The first rear axle half shaft 350 extends substantially perpendicular to the rear axle system input shaft 323. A first end portion 352 of the first rear axle half shaft 350 is drivingly connected to a first rear axle wheel end assembly 354. The first rear axle wheel end assembly 354 includes a first rear axle sealing assembly 356 and a first rear axle wheel assembly 358. A second end portion 360 of the first rear axle half shaft 350 is drivingly connected to an end of the rear axle differential 348. As a non-limiting example, the second end portion 360 of the first rear axle half shaft 350 is drivingly connected to a rear axle differential side gear, a separate stub shaft, a separate coupling shaft, a first rear axle half shaft axle disconnect system, a first rear axle differential output shaft and/or a shaft that is formed as part of a rear axle differential side gear.

Extending substantially perpendicular to the rear axle system input shaft 323 is the second rear axle half shaft 352. A first end portion 354 of the second rear axle half shaft 352 is drivingly connected to a second rear axle wheel end assembly 356. The second rear axle wheel end assembly 356 includes a second rear axle sealing assembly 358 and a second rear axle wheel assembly 360. A second end portion 362 of the second rear axle half shaft 352 is drivingly connected to an end of the rear axle differential 348 opposite the first rear axle half shaft 350. As a non-limiting example, the second end portion 362 of the second rear axle half shaft 352 is drivingly connected to a rear axle differential side gear, a separate stub shaft, a separate coupling shaft, a second rear axle half shaft axle disconnect system, a second rear axle differential output shaft and/or a shaft that is formed as part of a rear axle differential side gear.

It is within the scope of this disclosure that one or more of the sealing assemblies 332, 342, 356 and/or 358 may include the use of a sealing assembly according to an embodiment of the disclosure.

Figure 4:
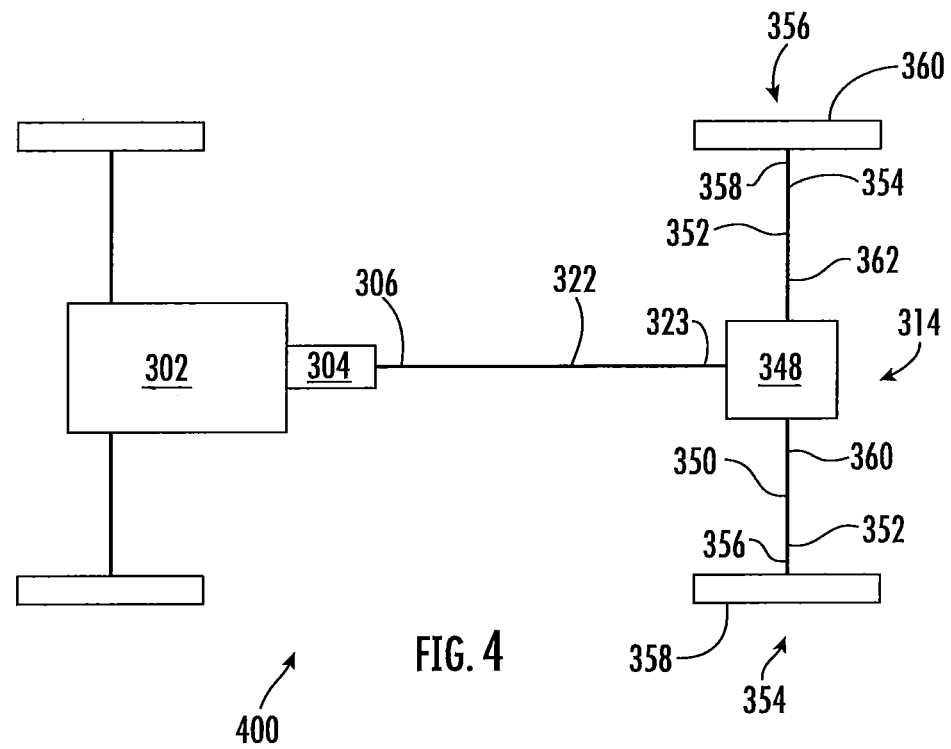
FIG. 4 is a schematic top-plan view of still another vehicle having one or more sealing assemblies according to an embodiment of the disclosure.

FIG. 4 is a schematic top-plan view of still another vehicle 400 having one or more sealing assemblies according to an embodiment of the disclosure. The vehicle 400 illustrated in FIG. 4 is the same as the vehicle 300 illustrated in FIG. 3, except where specifically noted below. As illustrated in FIG. 4 of the disclosure and as a non-limiting example, the vehicle 400 does not include the use of the transfer case 310 that drivingly connects the transmission 304 to the front axle system 312.

In accordance with the embodiment illustrated in FIG. 4 and as a non-limiting example, at least a portion of the transmission output shaft 306, opposite the transmission 304, is drivingly connected to at least a portion of the second shaft 322 opposite the rear axle system input shaft 323. As a result, in accordance with the embodiment of the disclosure illustrated in FIG. 4 and as a non-limiting example, the second shaft 322 of the vehicle 400 extends from the transmission output shaft 306 toward the rear axle system 314 of the vehicle 400.

It is within the scope of this disclosure that one or more of the sealing assemblies 356 and/or 358 may include the use of a sealing assembly according to an embodiment of the disclosure.

Figure 5:
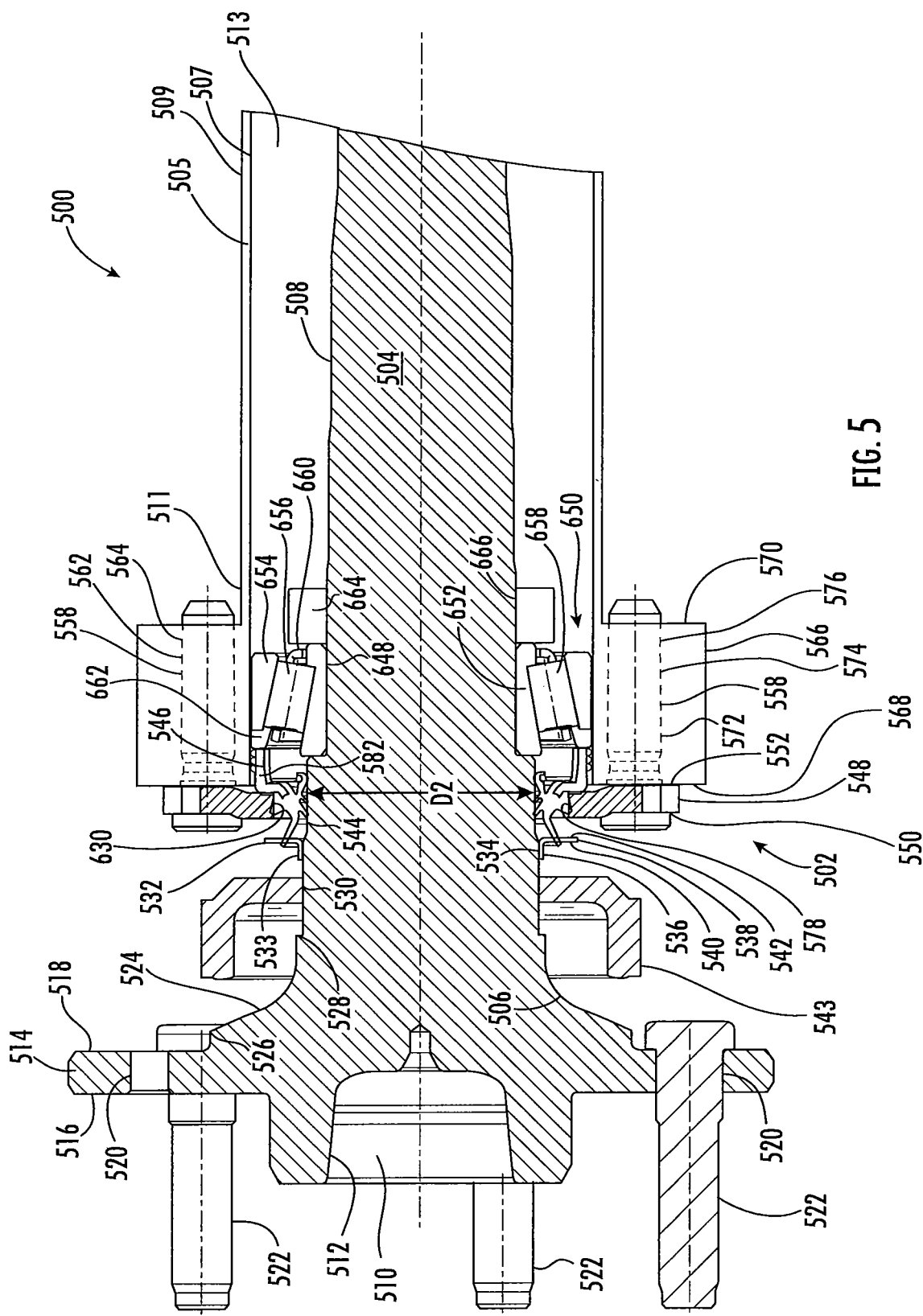
FIG. 5 is a cut-away schematic side-view of a portion of a wheel end assembly having one or more sealing assemblies with one or more sealing members according to an embodiment of the disclosure.

FIG. 5-9 provide a cut-away schematic side-view of a portion of a wheel end assembly 500 having one or more sealing assemblies 502 according to an embodiment of the disclosure. As illustrated in FIG. 5 of the disclosure and as a non-limiting example, the wheel end assembly 500 includes a shaft 504 having a first end portion 506, a second end portion (not shown) and an outer surface 508. At least a portion of the second end portion (not shown) of the shaft 504 is drivingly connected at a differential assembly (not shown), such as but not limited to, a front axle differential, a rear axle differential, a forward tandem axle differential and/or a rear tandem axle differential. It is within the scope of this disclosure and as a non-limiting example that the shaft 504 may be an axle half shaft, a first front axle half shaft, a second front axle half shaft, a first rear axle half shaft, a second rear axle half shaft, a first forward tandem axle half shaft, a second forward tandem axle half shaft, a first rear tandem axle half shaft and/or a second rear tandem axle half shaft.

Extending co-axially with at least a portion of the shaft 504 is a housing 505 having an inner surface 507, an outer surface 509, a first end portion 511 and a second end portion (not shown). The inner surface 507 and the outer surface 509 of the housing 505 defines a hollow portion 513 therein. As illustrated in FIG. 5 of the disclosure and as a non-limiting example, at least a portion of the shaft 504 is received and/or retained within at least a portion of the hollow portion 513 of the housing 505. Furthermore, as illustrated in FIG. 5 of the disclosure and as a non-limiting example, at least a portion of the first end portion 506 of the shaft 504 is disposed axially outboard from the first end portion 511 of the housing 505. As a result, at least a portion of the first end portion 506 of the shaft 504 is not disposed within the hollow portion 513 of the housing 505 and therefore extends outside the housing 505 of the wheel end assembly 500. It is within the scope of this disclosure that the housing 505 may be an axle half shaft housing, a first front axle half shaft housing, a second front axle half shaft housing, a first rear axle half shaft housing, a second rear axle half shaft housing, a first forward tandem axle half shaft housing, a second forward tandem axle half shaft housing, a first rear tandem axle half shaft housing and/or a second rear tandem axle half shaft housing.

As illustrated in FIG. 5 of the disclosure and as a non-limiting example, at least a portion of the first end portion 506 of the shaft 504 includes a hollow interior portion 510. The hollow interior portion 510 in the first end portion 506 of the shaft 504 is defined by inner surface 512.

Circumferentially extending from at least a portion of the outer surface 508 of the first end portion 506 of the shaft 504 is a flange portion 514 having an axially outboard surface 516 and an axially inboard surface 518. The flange portion 514 is disposed axially outboard from the first end portion 511 of the housing 505 at a location outside of the hollow portion 513 of the housing 505. It is within the scope of this disclosure and as a non-limiting example that the flange portion 514 of the shaft 504 may be an axle flange.

As best seen in FIG. 5 of the disclosure and as a non-limiting example, the flange portion 514 includes one or more flange portion apertures 520 extending from the axially outboard surface 516 to the axially inboard surface 518 of the flange portion 514 of the wheel end assembly 500. The one or more flange portion apertures 520 are of a size and a shape to receive and/or retain at least a portion of one or more mechanical fasteners 522. The one or more mechanical fasteners 522 are used to attach at least a portion of a wheel assembly (not shown) to the flange portion 514 of the shaft 504. As a non-limiting example, the one or more mechanical fasteners 522 may be a bolt, a screw or any other conventional threaded fastener known in the art.

Disposed axially inboard from the flange portion 514 on the first end portion 506 of the shaft 504 is a tapered portion 524 having a first end 526 and a second end 528. As illustrated in FIG. 5 of the disclosure and as a non-limiting example, the tapered portion 524 has an outer diameter that decreases from the first end 526 to the second end 528 of the tapered portion 524.

Axially inboard from and directly adjacent to the second end 528 of the tapered portion 524 of the shaft 504 is a first reduced diameter portion 530. It is within the scope of this disclosure and as a non-limiting example that the first reduced diameter portion 530 of the shaft 504 may be substantially cylindrical in shape with a substantially constant outside diameter.

Integrally connected to at least a portion of the outer surface of the outer surface 508 of the first reduced diameter portion 530 of the shaft 504 is a slinger 532, having a substantially cylindrical portion 533 with an inner surface 534 and an outer surface 536. As illustrated in FIG. 5 of the disclosure and as a non-limiting example, at least a portion of the inner surface 534 of the substantially cylindrical portion 533 of the slinger 532 is integrally connected to at least a portion of the outer surface 508 of the first reduced diameter portion 530 of the shaft 504. According to an embodiment of the disclosure and as a non-limiting example, at least a portion of the inner surface 534 of the substantially cylindrical portion 533 of the sealing portion 530 may be integrally connected to at least a portion of the outer surface 508 of the first reduced diameter portion 530 of the shaft 504 by using one or more mechanical fasteners, one or more welds, one or more adhesives and/or a threaded connection. In accordance with an alternative embodiment of the disclosure and as a non-limiting example, the slinger 532 may be integrally formed as part of the outer surface 508 of the first reduced diameter portion 530 of the shaft 504.

Circumferentially extending outboard from at least a portion of the outer surface 536 of the substantially cylindrical portion 533 of the slinger 532 is an increased diameter portion 538 having a first side 540 and a second side 542. As best seen in FIG. 5 of the disclosure and as a non-limiting example, the increased diameter portion 538 of the slinger 532 may be substantially disk-shaped. It is to be understood that the second side 542 of the increased diameter portion 538 provides a sealing surface for at least a portion of the one or more sealing assemblies 502 of the wheel end assembly 500. As a non-limiting example, the slinger 532 may have a substantially L-shaped cross-sectional shape.

Interposed between the slinger 532 and the flange portion 514 of the wheel end assembly 500 is a portion of a braking assembly 543. It is within the scope of this disclosure and as a non-limiting example that the portion of the braking assembly 543 may be a portion of a disc brake assembly, a portion of a drum brake assembly and/or a parking brake assembly.

Disposed axially inboard from and directly adjacent to the first reduced diameter portion 530 of the shaft 504 is a second reduced diameter portion 544. As a result, it is to be understood that the second reduced diameter portion 544 of the shaft 504 has an outer diameter that is smaller than the outer diameter of the of the first reduced diameter portion 530 of the shaft 504. It is within the scope of this disclosure and as a non-limiting example that the second reduced diameter portion 544 of the shaft 504 may be substantially cylindrical in shape with a substantially constant outside diameter.

As best seen in FIG. 5 of the disclosure and as a non-limiting example, at least a portion of the one or more sealing assemblies 502 are disposed radially outboard from at least a portion of the second reduced diameter portion 544 of the shaft 504. According to the embodiment of the disclosure and as a non-limiting example, the one or more sealing assemblies 502 may include one or more sealing members 546 and one or more retaining members 548.

Figure 6:
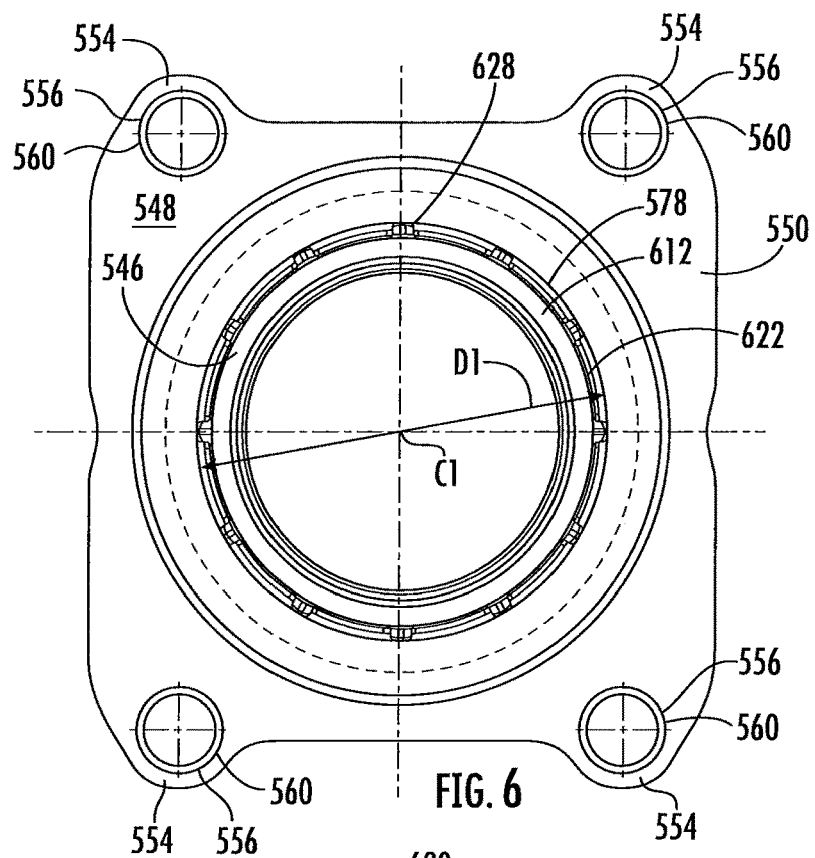
FIG. 6 is a schematic top-plan view of a portion of the sealing assembly according to the embodiment of the disclosure illustrated in FIG. 5.

In accordance with the embodiment of the disclosure illustrated in FIGS. 5 and 6 and as a non-limiting example, the one or more retaining members 548 have an axially outboard surface 550, an axially inboard surface 552 and one or more attachment flanges 554. According to an embodiment of the disclosure and as a non-limiting example, the one or more retaining members 548 may be substantially square or substantially rectangular in shape having one or more of the one or more attachment flanges 554 disposed at one or more of the corners of the one or more retaining members 548. However, it is within the scope of this disclosure, that the one or more retaining members 548 may take any other shape.

One or more attachment apertures 556 may extend from the axially outboard surface 550 to the axially inboard surface 552 of the one or more attachment flanges 554 of the one or more retaining members 548. The one or more attachment apertures 556 are of a size and a shape to receive and/or retain at least a portion of one or more mechanical fasteners 558. According to an embodiment of the disclosure (not shown) and as a non-limiting example, an inner surface 560 defining the one or more attachment apertures 556 may include a plurality of threads (not shown) that are complementary to a plurality of threads 562 extending from at least a portion of an outer surface 564 of the one or more mechanical fasteners 558. In accordance with an alternative embodiment of the disclosure and as a non-limiting example, the surface 560 defining the one or more attachment apertures 556 may be substantially smooth thereby receiving at least a portion of the one or more mechanical fasteners 558 but not retaining the one or more mechanical fasteners 558. It is within the scope of this disclosure and as a non-limiting example that the one or more mechanical fasteners 558 may be one or more bolts, screws or any other conventional fastener known in the art to attach one component to another.

Circumferentially extending from outboard from at least a portion of the outer surface 509 of the first end portion 511 of the housing 505 is one or more retaining member attachment flanges 566. As illustrated in FIG. 5 of the disclosure and as a non-limiting example, the one or more retaining member attachment flanges 566 of the housing 505 have an axially outboard surface 568 and an axially inboard surface 570. Extending from the axially outboard surface 568 of the one or more retaining member attachment flanges 566 to or toward axially inboard surface 570 of the one or more retaining member attachment flanges 566 is one or more retaining member attachment apertures 572. As a result, it is to be understood that the one or more retaining member attachment apertures 572 of the one or more retaining member attachment flanges 566 may or may not extend all the way from the axially outboard surface 568 to the axially inboard surface 570 of the one or more retaining member attachment flanges 566. It is within the scope of this disclosure and as a non-limiting example that the one or more retaining member attachment apertures 572 of the one or more retaining member attachment flanges 566 of the housing 505 may have a size and shape to receive and/or retain at least a portion of the one or more mechanical fasteners 558.

In accordance with an embodiment of the disclosure and as a non-limiting example, a plurality of threads 576 may circumferentially extend along at least a portion of a surface 574 defining the one or more retaining member attachment apertures 572 of the one or more retaining member attachment flanges 566. The plurality of threads 576 are complementary to the plurality of threads 562 on an outer surface 564 of the one or more mechanical fasteners 558.

Extending from the axially outboard surface 550 to the axially inboard surface 552 of the one or more retaining members 548 is one or more sealing member apertures 578. In accordance with the embodiment of the disclosure illustrated in FIG. 6 and as a non-limiting example, the one or more sealing member apertures 578 are oriented about a center C1 of the one or more retaining members 548 of the one or more sealing assemblies 502. As illustrated in FIGS. 5 and 6 of the disclosure and as a non-limiting example, the one or more sealing member apertures 578 may have a size and a shape to receive and/or retain at least a portion of the one or more sealing members 546 of the one or more sealing assemblies 502. It is within the scope of this disclosure and as a non-limiting example that at least a portion of the one or more sealing members 546 may be received and/or retained within at least a portion of the one or more sealing members 546 by using a press-fit, friction fit and/or interference fit type connection.

As best seen in FIG. 5-9 of the disclosure and as a non-limiting example, the one or more sealing members 546 may include a seal casing 580 having a substantially cylindrical portion 582 with a first end portion 584, a second end portion 586, an inner surface 588 and an outer surface 590. The seal casing 580 of the one or more sealing members 546 provides structural rigidity to the one or more sealing members 546 thereby aiding in improving the overall life and durability of the one or more sealing members 546. As illustrated in FIG. 5 of the disclosure and as a non-limiting example, at least a portion of the substantially cylindrical portion 582 of the seal casing 580 of the one or more sealing members 546 may be disposed within at least a portion of hollow portion 513 of the housing 505. It is within the scope of this disclosure and as a non-limiting example that the seal casing 580 is made of an iron alloy, a steel alloy, a stainless steel alloy or an aluminium alloy.

Extending radially inboard from at least a portion of the first end portion 584 of the substantially cylindrical portion 582 of the seal casing 580 is a decreased diameter portion 592 having a first end portion 594 and a second end portion 596. According to an embodiment of the disclosure and as a non-limiting example, the decreased diameter portion 592 may extend substantially perpendicularly to and radially inboard from at least a portion of the first end portion 584 of the substantially cylindrical portion 582 of the seal casing 580. It is within the scope of this disclosure and as a non-limiting example that the decreased diameter portion 592 of the seal casing 580 may have a substantially disk-shaped cross-sectional shape.

Figures 8, 9:
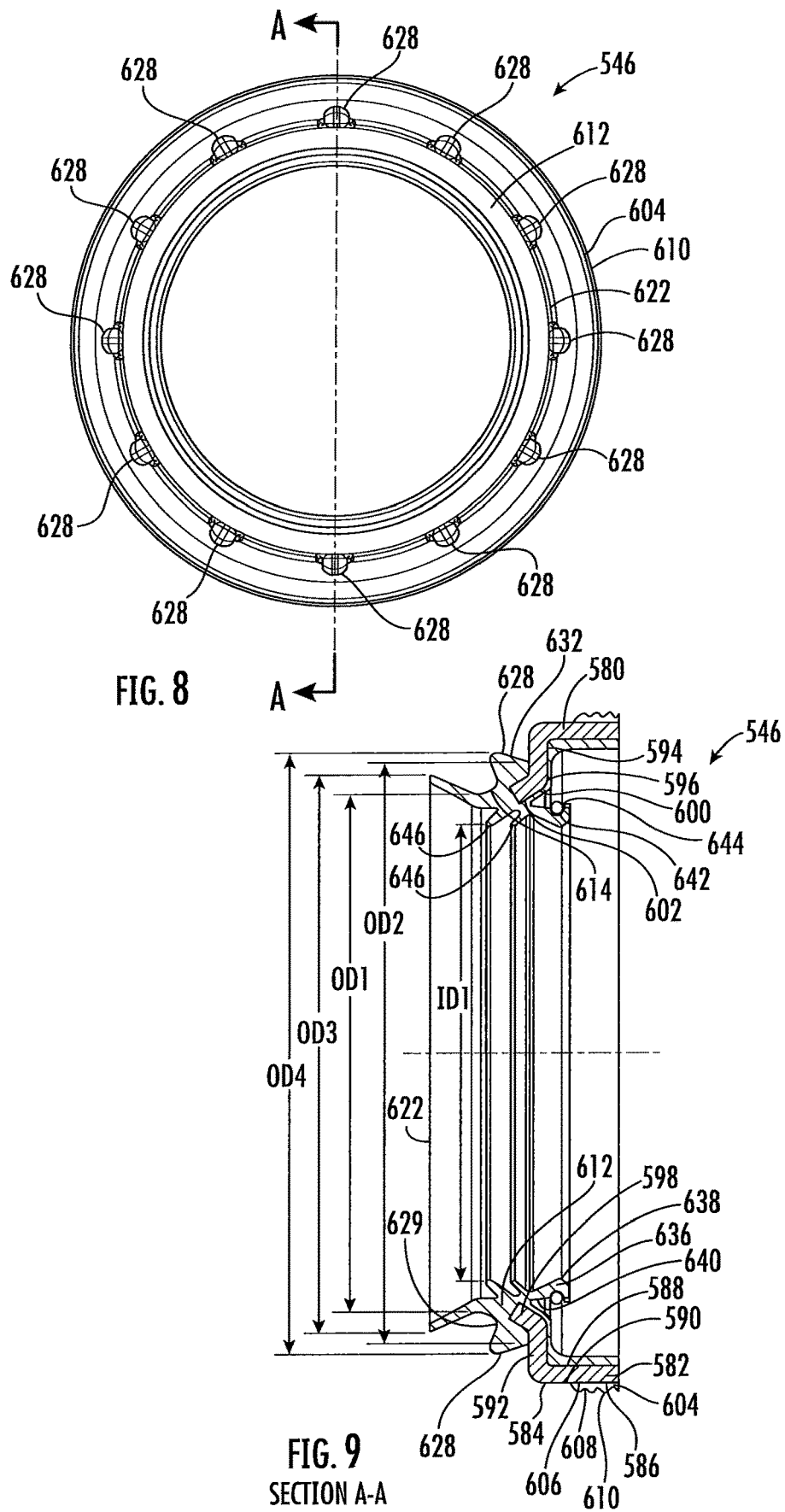
FIG. 8 is a schematic top-plan view of the one or more sealing members illustrated in FIG. 7 of the disclosure.
FIG. 9 is a schematic cross-sectional view of the one or more sealing members illustrated in FIG. 8 of the disclosure along the line A-A.

As best seen in FIG. 9 and as a non-limiting example, an axially extending portion 598 having a first end portion 600 and a second end portion 602 may extend inboard from at least a portion of the second end portion 596 of the decreased diameter portion 592 of the seal casing 580. In accordance with an embodiment of the disclosure and as a non-limiting example, a diameter of the axially extending portion 598 of the seal casing 580 may decrease at a substantially constant rate or a variable rate from the first end portion 600 to the second end portion 602 of the axially extending portion 598 of the seal casing 580. It is within the scope of this disclosure and as a non-limiting example that the seal casing 580 of the one or more sealing members 546 may have a substantially chair-shaped cross-sectional shape.

Circumferentially extending along at least a portion of the outer surface 590 of the substantially cylindrical portion 582 of the seal casing 580 is one or more first sealing portions 604 having an inner surface 606 and an outer surface 608. According to an embodiment of the disclosure and as a non-limiting example, at least a portion of the inner surface 606 of the one or more first sealing portions 604 of the one or more sealing members 546 may be integrally connected to at least a portion of the substantially cylindrical portion 582 of the seal casing 580 by using an interference fit connection, a friction fit connection, a press fit connection, one or more adhesives and/or one or more welds. In accordance with an alternative embodiment of the disclosure and as a non-limiting example, at least a portion of the inner surface 606 of the one or more first sealing portions 604 of the one or more sealing members 546 may be integrally connected to at least a portion of the substantially cylindrical portion 582 of the seal casing 580 as a result of one or more molding processes. As a result, it is therefore to be understood that the one or more molding processes may integrally form the one or more first sealing portions 604 to the outer surface 590 of the seal casing 580. It is within the scope of this disclosure and as a non-limiting example that the molding process may be an injection molding process. Additionally, it is within the scope of this disclosure and as a non-limiting example that the one or more first sealing portions 604 may be made of an elastomeric composition, a rubber composition, a fluoro-elastomer composition, a nitrile rubber composition, a hydrogenated nitrile butadiene rubber composition, a poly-acrylic rubber composition, an ethylene acrylic rubber composition, a silicone rubber composition, a fluoro-silicone rubber composition or a combination thereof.

As illustrated in FIGS. 5-9 of the disclosure and as a non-limiting example, one or more static sealing ribs 610 may circumferentially extend outboard from at least a portion of the outer surface 608 of the one or more first sealing portions 604 of the one or more sealing members 546. In accordance with the embodiment of the disclosure illustrated in FIG. 5 and as a non-limiting example, an outer diameter of the one or more static sealing ribs 610 of the one or more first sealing portions 604 may be substantially equal to or slightly larger than an inner diameter of the first end portion 511 of the housing 505. As a result, when the one or more sealing members 546 is inserted within the hollow portion 513 of the first end portion 511 of the housing 505, the one or more static sealing ribs 610 are elastically deformed thereby providing a sealing engagement between the seal casing 580 of the one or more sealing members 546 and the inner surface 507 of the housing 505. This sealing engagement between the one or more sealing members 546 and the housing 505 aids in ensuring that an amount of lubrication fluid (not shown) disposed within the housing 505 remains within the housing 505. Additionally, the sealing engagement between the one or more sealing members 546 and the housing 505 aids in preventing the migration of dirt, debris and/or moisture from the environment into the housing 505 thereby increasing the overall life and durability of the of the wheel end assembly 500.

Integrally connected to at least a portion of the inner surface 588 of the substantially cylindrical portion 582 of the seal casing 580, the decreased diameter portion of the seal casing 580 and/or the axially extending portion 598 of the seal casing 580 is one or more second sealing portions 612. According to an embodiment of the disclosure and as a non-limiting example, at least a portion of the one or more second sealing portions 612 of the one or more sealing members 546 may be integrally connected to at least a portion of the seal casing 580 by using an interference fit connection, a friction fit connection, a press fit connection, one or more adhesives and/or one or more welds. In accordance with an alternative embodiment of the disclosure and as a non-limiting example, at least a portion of the one or more second sealing portions 612 of the one or more sealing members 546 may be integrally connected to at least a portion of the seal casing 580 as a result of one or more molding processes. As a result, it is to be understood that the one or more molding processes may integrally form the one or more second sealing portions 612 of the one or more sealing members 546 to at least a portion of the seal casing 580 of the one or more sealing members 546. As a non-limiting example, the one or more molding processes may be an injection molding process. It is within the scope of this disclosure that the one or more first and second sealing portions 604 and 612 of the one or more sealing members 546 may be molded onto the seal casing 580 in a single molding process or in multiple molding processes, such as but not limited to, one or more injection molding processes. Additionally, it is within the scope of this disclosure and as a non-limiting example that the one or more second sealing portions 612 may be made of an elastomeric composition, a rubber composition, a fluoro-elastomer composition, a nitrile rubber composition, a hydrogenated nitrile butadiene rubber composition, a poly-acrylic rubber composition, an ethylene acrylic rubber composition, a silicone rubber composition, a fluoro-silicone rubber composition or a combination thereof.

The one or more second sealing portions 612 of the one or more sealing members 546 includes a retaining member sealing surface 614 having a first end portion 616, a second end portion 618 and an outer surface 620. At least a portion of the retaining member sealing surface 614 of the one or more second sealing portions 612 of the one or more sealing members 546 sealingly engages with at least a portion of the one or more retaining members 548. The sealing engagement between the retaining member sealing surface 614 and the one or more retaining members 548 aids in preventing the migration of dirt, debris and/or moisture into the housing 505 thereby increasing the overall life and durability of the of the wheel end assembly 500. Additionally, the sealing engagement between the one or more retaining members 548 and the retaining member sealing surface 614 aids in preventing the migration of an amount of the lubrication fluids (not shown) from within the housing 505 to the environment.

Figure 7:
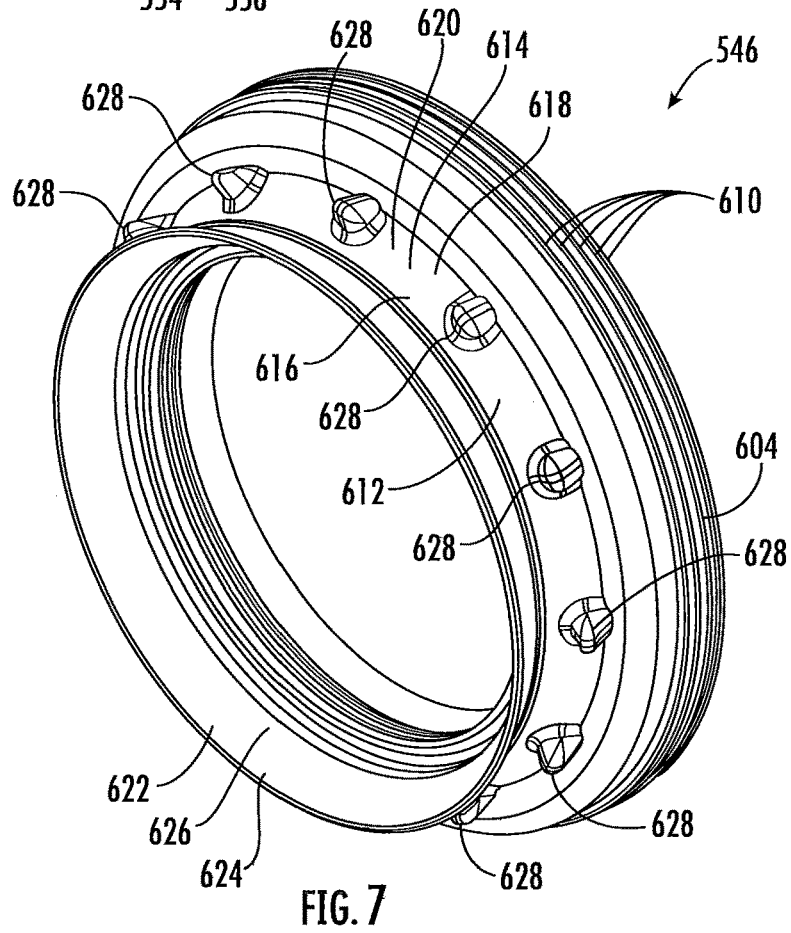
FIG. 7 is a schematic perspective view of the one or more sealing members of the one or more sealing assemblies illustrated in FIGS. 5 and 6 according to an embodiment of the disclosure.

As best seen in FIGS. 5, 7 and 9 of the disclosure and as a non-limiting example, the outer surface 620 of the retaining member sealing surface 614 of the one or more second sealing portions 612 of the one or more sealing members 546 has an outer diameter that increases from the first end portion 616 to the second end portion 618 of the retaining member sealing surface 614. As a result, it is within the scope of this disclosure and as a non-limiting example that the first end portion 616 of the retaining member sealing surface 614 may have an outer diameter OD1 that is smaller than an outermost diameter OD2 of the second end portion 618 of the retaining member sealing surface 614.

Circumferentially extending outboard from at least a portion of the first end portion 616 of the retaining member sealing surface 614 is one or more first axially extending sealing lips 622 having a first end portion 624 and a second end portion 626. As best seen in FIG. 9 of the disclosure and as a non-limiting example, the first end portion 624 of the one or more first axially extending sealing lips 622 may have an outer diameter OD3 that is larger than the outer diameter OD1 of the first end portion 616 of the retaining member sealing surface 614. Additionally, as best seen in FIG. 9 of the disclosure and as a non-limiting example, the outer diameter OD3 of the one or more first axially extending sealing lips 622 may be smaller than the outermost diameter OD2 of the second end portion 618 of the retaining member sealing surface 614 of the one or more second sealing portions 612 of the one or more sealing members 546.

When the one or more sealing members 546 are assembled with the one or more retaining members 548, at least a portion of the first end portion 624 of the one or more first axially extending sealing lips 622 extend axially outboard beyond the axially outboard surface 550 of the one or more retaining members 548 toward the slinger 532. As best seen in FIG. 5 of the disclosure and as a non-limiting example the one or more first axially extending sealing lips 622 extend axially outboard until at least a portion of the first end portion 624 of the one or more first axially extending sealing lips 622 are in direct contact with at least a portion of the second side 542 of the increased diameter portion 538 of the slinger 532. When the one or more first axially extending sealing lips 622 contact the second side 542 of the increased diameter portion 538 of the slinger 532, it elastically deforms the one or more first axially extending sealing lips 622 radially outboard thereby providing a sealing engagement between the one or more sealing members 546 and the slinger 532. The sealing engagement between the increased diameter portion 538 of the slinger 532 and the one or more sealing members 546 aids in preventing the migration of dirt, debris and/or moisture into the housing 505 thereby aiding in increasing the overall life and durability of the of the wheel end assembly 500. Additionally, the sealing engagement between the increased diameter portion 538 of the slinger 532 and the one or more sealing members 546 aids in preventing the migration of an amount of the lubrication fluids (not shown) disposed within the housing 505 out of the housing 505.

Circumferentially extending from at least a portion of the outer surface 620 of the retaining member sealing surface 614 of the one or more second sealing portions 612 of the one or more sealing members 546 is one or more sealing member retention ribs 628. As best seen in FIGS. 6 and 9 of the disclosure and as a non-limiting example, the radially outboard surface 632 of the one or more sealing member retention ribs 628 of the one or more second sealing portions 612 may have an outermost diameter OD4 that is substantially equal to or larger than a diameter D1 of the one or more sealing member apertures 578 of the one or more retaining members 548. As a result, when the one or more sealing members 546 are inserted within the one or more sealing member apertures 578, a surface 630 defining the one or more sealing member apertures 578 elastically deforms the one or more sealing member retention ribs 628 thereby providing an amount of frictional force between the one or more retaining members 548 and the one or more sealing members 546 needed to receive and retain the one or more sealing members 546 within the one or more sealing member apertures 578. By securing the one or more sealing members 546 within the one or more sealing member apertures 578 of the one or more retaining members 548, it prevents the one or more retaining members 548 from freely floating on the one or more sealing members 546 and pinching or squeezing it against the outer surface 508 of the shaft 504. This aids in increasing the overall life and durability of the one or more sealing assemblies 502. Additionally, this increase in the overall life and durability of the one or more sealing assemblies 502 results in fewer warranty claims, which reduces the overall costs associated with the one or more sealing assemblies 502.

Furthermore, the frictional engagement between the one or more sealing members 546 and one or more retaining members 548, the geometry of the one or more sealing member retention ribs 628, the location of the one or more sealing member retention ribs 628 along the retaining member sealing surface 614, the distribution of the one or more sealing member retention ribs 628 about the retaining member sealing surface 614, the shape of the one or more sealing member apertures 578 and/or the diameter D1 of the one or more sealing member apertures 578 aid in ensuring that the one or more sealing members 546 are centered relative to the one or more retaining members 548. This aids in ensuring that the one or more one or more sealing members 546 are disposed and retained in their pre-determined optimal operating positions. As a result, it is therefore to be understood that this further aids in increasing the overall life and durability of the one or more sealing members 546 and decreases the overall costs associated with the one or more sealing members 546.

As best seen in FIGS. 5, 7 and 9 of the disclosure and as a non-limiting example, the one or more sealing member retention ribs 628 may an under-cut portion 629. The under-cut portion 629 of the one or more sealing member retention ribs 628 make it easier to elastically deform the one or more sealing member retention ribs 628 during assembly of the one or more sealing members 546 within the one or more retaining members 548. As a result, it is to be understood that the under-cut portion 629 of the one or more sealing member retention ribs 628 reduces the overall assembly and disassembly time associated with the one or more sealing assemblies 502 thereby further aiding in reducing the overall costs associated with the one or more sealing assemblies 502.

In accordance with the embodiment illustrated in FIG. 9 and as a non-limiting example, the outermost diameter OD4 of the one or more sealing member retention ribs 628 may be larger than the outermost diameter OD2 of the second end portion 618 of the retaining member sealing surface 614. Additionally, as illustrated in FIGS. 5-9 and as a non-limiting example, a radially outboard surface 632 of the one or more sealing member retention ribs 628 may have a substantially flat shape. The substantially flat shape of the radially outboard surface 632 of the one or more sealing member retention ribs 628 provides a substantially flat mating surface between the one or more sealing members 546 and the one or more retaining members 548 of the one or more sealing assemblies 502. This increases the overall surface area contact between the one or more sealing member retention ribs 628 and the one or more retaining members 548 thereby providing a stronger and more robust connection and/or sealing engagement between the one or more sealing members 546 and the one or more retaining members 548.

Extending circumferentially and axially inboard from at least a portion of an inner surface 634 of the one or more second sealing portions 612 of the one or more sealing members 546 is one or more second axially extending sealing lips 636 having an inner surface 638 and an outer surface 640. The one or more second axially extending sealing lips 636 may have an inner diameter that is substantially equal to or less than an outer diameter of the second reduced diameter portion 544 of the shaft 504. As a result, when the one or more sealing assemblies 502 are assembled within the wheel end assembly 500, the one or more second axially extending sealing lips 636 are elastically deformed about the outer surface 508 of the shaft 504. By elastically deforming the one or more second axially extending sealing lips 636, it provides a sealing engagement between at least a portion of the outer surface 508 of the shaft 504 and the one or more second axially extending sealing lips 636. The sealing engagement between the one or more second axially extending sealing lips 636 and the second reduced diameter portion 544 of the shaft 504, further aids in preventing the migration of dirt, debris and/or moisture into the housing 505 thereby increasing the overall life and durability of the of the wheel end assembly 500. Additionally, the sealing engagement between the second reduced diameter portion 544 of the shaft 504 and the one or more second axially extending sealing lips 636 of the one or more sealing members 546, further aid in preventing the migration of an amount of the lubrication fluids (not shown) from within the housing 505 to the environment.

Circumferentially extending along at least a portion of the outer surface 640 of the one or more second axially extending sealing lips 636 of the one or more sealing members 546 is a spring groove 642. The spring groove 642 may be of a size and shape to receive and/or retain at least a portion of a spring member 644. The spring member 644 applies an amount of radially inward force onto at least a portion of the one or more second axially extending sealing lips 636. This radially inward force applied by the spring member 644 aids in ensuring a tight and robust sealing engagement between the inner surface 638 of the one or more second axially extending sealing lips 636 and the outer surface 508 of the shaft 504. Additionally, the spring member 644 aids in ensuring that the one or more second axially extending sealing lips 636 do not move radially outboard beyond a pre-determined distance away from the outer surface 508 of the shaft 504. As a result, this ensures that there is a constant seal between the inner surface 638 of the one or more second axially extending sealing lips 636 and the outer surface 508 of the shaft 504 when in operation. It is within the scope of this disclosure and as a non-limiting example that the spring member 644 may be a garter spring. Additionally, it is within the scope of this disclosure and as a non-limiting example that the spring member 644 may be made of an iron alloy, a steel alloy, an aluminium alloy or a stainless steel alloy.

Interposed between at least a portion of the one or more second axially extending sealing lips 636 and at least a portion of the one or more first axially extending sealing lips 622 is one or more radially extending sealing lips 646. As best seen in FIG. 9 of the disclosure and as a non-limiting example, the one or more radially extending sealing lips 646 circumferentially extend inboard from at least a portion of the inner surface 634 of the one or more second sealing portions 612. Additionally, as best seen in FIG. 9 of the disclosure and as a non-limiting example, the one or more radially extending sealing lips 646 have an innermost diameter ID1 that is substantially equal to or less than a diameter D2 of the second reduced diameter portion 544 of the shaft 504. As a result, when the one or more sealing assemblies 502 are assembled within the wheel end assembly 500, the one or more radially extending sealing lips 646 are elastically deformed. By elastically deforming the one or more radially extending sealing lips 646, it provides a sealing engagement between the outer surface 508 of the second reduced diameter portion 544 of the shaft 504 and the one or more radially extending sealing lips 646. The sealing engagement between the one or more radially extending sealing lips 646 and the shaft 504, further aids in preventing the migration of dirt, debris and/or moisture into the housing 505 thereby aiding in increasing the overall life and durability of the of the wheel end assembly 500. Additionally, the sealing engagement between the one or more radially extending sealing lips 646 of the one or more sealing members 546 and the second reduced diameter portion 544 of the shaft 504, further aids in preventing the migration of an amount of the lubrication fluids (not shown) from within the housing 505.

Disposed axially inboard from and directly adjacent to the second reduced diameter portion 544 of the shaft 504 is a third reduced diameter portion 648. Extending concentrically with the shaft 504 and disposed radially outboard from the third reduced diameter portion 648 of the shaft 504 is one or more bearing assemblies 650. As best seen in FIG. 5 of the disclosure and as a non-limiting example, the one or more bearing assemblies 650 include an inner race 652, an outer race 654 and a plurality of rolling elements 656 interposed between the inner and outer races 652 and 654. Additionally, as best seen in FIG. 5 of the disclosure and as a non-limiting example, at least a portion of the plurality of rolling elements 656 are disposed within one or more openings 658 of a retaining member 660. It is within the scope of this disclosure and as a non-limiting example that the one or more bearing assemblies 650 may be one or more tapered roller bearing assemblies and/or one or more angular contact ball bearing assemblies.

Integrally connected to at least a portion of the outer race 654 of the one or more bearing assemblies 650 is one or more sealing member contact portions 662. When assembled, at least a portion of the second end portion 584 of the substantially cylindrical portion 582 of the one or more sealing members 546 may be in direct contact with at least a portion of the one or more sealing member contact portions 662 of the one or more bearing assemblies 650 of the wheel end assembly 500. As best seen in FIG. 5 of the disclosure and as a non-limiting example, when the one or more retaining members 548 are attached to the first end portion 511 of the housing 505, the one or more sealing members 546 apply a pre-determined amount of force onto the one or more sealing members 546. As a result, the one or more retaining members 548 and/or the one or more sealing members 546 apply a pre-determined amount of a pre-loading force onto the one or more bearing assemblies 650 of the wheel end assembly 500. It is within the scope of this disclosure and as a non-limiting example that at least a portion of the one or more sealing member contact portions 662 may be integrally connected to at least a portion of the outer race 654 of the one or more bearing assemblies 650 by using one or more welds and/or one or more adhesives.

Extending co-axially with the shaft 504 is an annular member 664. As best seen in FIG. 5 of the disclosure and as a non-limiting example, the annular member 664 is disposed axially inboard from and directly adjacent to the one or more bearing assemblies 650 of the wheel end assembly 500. The annular member 664 axially retains the one or more bearing assemblies 650 along the third reduced diameter portion 648 of the shaft 504. It is within the scope of this disclosure and as a non-limiting example that the annular member 664 may apply an additional amount of pre-loading force onto the one or more bearing assemblies 650. According to an embodiment of the disclosure and as a non-limiting example, at least a portion of an inner surface 666 of the annular member 664 may be integrally connected to at least a portion of the outer surface 508 of the third reduced diameter portion 648 of the shaft 504 by using one or more mechanical fasteners, one or more welds, one or more adhesives and/or a threaded connection. In accordance with an alternative embodiment of the disclosure (not shown) and as a non-limiting example, the annular member 664 may be integrally formed as part of the outer surface 508 of the third reduced diameter portion 648 of the shaft 504.

Figure 10:
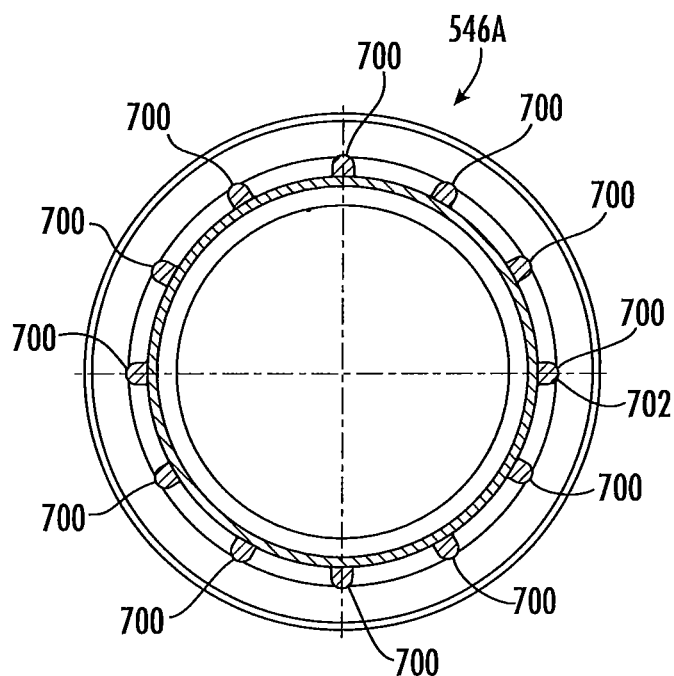
FIG. 10 is a schematic top-plan view of the one or more sealing members illustrated in FIGS. 5-9 according to an alternative embodiment of the disclosure.
Figure 10A:
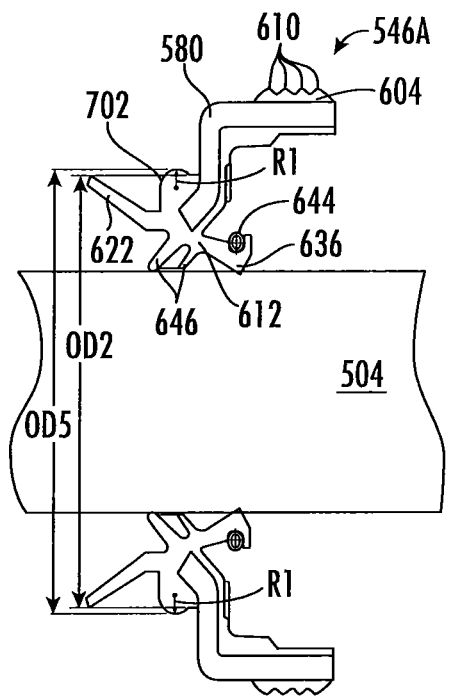
FIG. 10A is a schematic cross-sectional view of a portion of the one or more sealing members illustrated in FIG. 10 of the disclosure.

FIGS. 10 and 10A provide a schematic illustration of one or more sealing members 546A of the one or more sealing assemblies 502 according to an alternative embodiment of the disclosure. The one or more sealing members 546A illustrated in FIGS. 10 and 10A are the same as the one or more sealing members 546 illustrated in FIGS. 5-9, except where specifically noted below. As illustrated in FIGS. 10 and 10A of the disclosure and as a non-limiting example, the one or more sealing members 546A do not include the one or more sealing member retention ribs 628 illustrated in FIGS. 5-9.

In accordance with the embodiment of the disclosure illustrated in FIGS. 10 and 10A and as a non-limiting example, the one or more second sealing portions 612 of the one or more sealing members 546A has one or more sealing member retention ribs 700 circumferentially extending from at least a portion of the outer surface 620 of the retaining member sealing surface 614 of the one or more sealing members 546A. The one or more sealing member retention ribs 700 of the one or more sealing members 546A may have an outermost diameter OD5 that is substantially equal to or larger than the diameter D1 of the one or more sealing member apertures 578 of the one or more retaining members 548. As a result, when the one or more sealing members 546A are inserted within the one or more sealing member apertures 578 of the one or more retaining members 548, the surface 630 defining the one or more sealing member apertures 578 elastically deforms the one or more sealing member retention ribs 700 thereby providing an amount of frictional force between the one or more sealing members 546A and the one or more retaining members 548. By securing the one or more sealing members 546A within the one or more sealing member apertures 578 of the one or more retaining members 548, it prevents the one or more retaining members 548 from freely floating on the one or more sealing members 546 and pinching or squeezing it against the outer surface 508 of the shaft 504. This aids in increasing the overall life and durability of the one or more sealing assemblies 502. Additionally, this increase in the overall life and durability of the one or more sealing assemblies 502 resulting in fewer warranty claims, which reduces the overall costs associated with the one or more sealing assemblies.

As illustrated in FIGS. 10 and 10A of the disclosure and as a non-limiting example, the outermost diameter OD5 of the one or more sealing member retention ribs 700 may be larger than the outermost diameter OD2 of the second end portion of the retaining member sealing surface 614 of the one or more sealing members 546A.

According to the embodiment of the disclosure illustrated in FIGS. 10 and 10A and as a non-limiting example, an outermost surface 702 of the one or more sealing member retention ribs 700 may be substantially spherical in shape having a radius of curvature R1. When the one or more sealing members 546A are inserted within the one or more sealing member apertures 578 of the one or more retaining members 548, the outermost surface 702 of the one or more sealing member retention ribs 700 are elastically deformed to substantially conform to the shape of the surface 630 defining the one or more sealing member apertures 578. As a result, the substantially spherical shape of the outermost surface 702 aids in providing an increased amount of surface are contact and frictional force between the one or more sealing member apertures 578 and the one or more sealing member retention ribs 700. This increased amount of frictional force between the one or more sealing member apertures 578 and the one or more sealing member retention ribs 700 aids in ensuring that the one or more sealing members 546A are more securely retained within the one or more sealing member apertures 578. As a result, it is to be understood that the substantially spherical shape of the outermost surface 702 of the one or more sealing member retention ribs 700 further aids in preventing the one or more retaining members 548 from freely floating on the one or more sealing members 546A and pinching or squeezing it against the outer surface 508 of the shaft 504.

Figure 11:
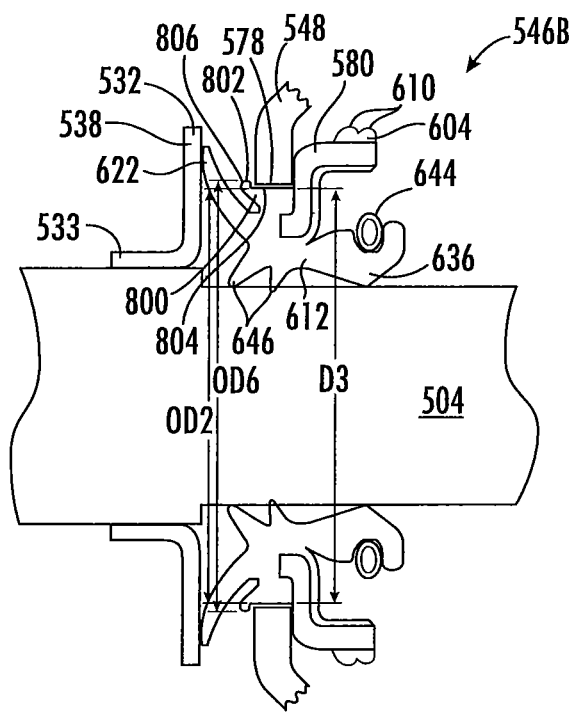
FIG. 11 is a schematic cross-sectional side-view of a portion of the one or more sealing members illustrated in FIGS. 5-10A according to another embodiment of the disclosure.

FIG. 11 is a schematic cross-sectional side-view of a portion of one or more sealing members 546B of the one or more sealing assemblies 502 according to another embodiment of the disclosure. The one or more sealing members 546B illustrated in FIG. 11 is the same as the one or more sealing members 546 and 546A illustrated in FIGS. 5-10A, except where specifically noted below. As illustrated in FIG. 11 and as a non-limiting example, the one or more sealing members 546B do not include the one or more sealing member retention ribs 628 and 700 illustrated in FIGS. 5-10A.

In accordance with the embodiment illustrated in FIG. 11 and as a non-limiting example, one or more sealing member retention ribs 800 circumferentially extend from at least a portion of the outer surface 620 of the retaining member sealing surface 614 of the one or more second sealing portions 612 of the one or more sealing members 546B. The one or more sealing member retention ribs 800 of the one or more sealing members 546B may have an outermost diameter OD6 that is larger than the diameter D1 of the sealing member aperture of the one or more retaining members 548.

Circumferentially extending along at least a portion of a radially outboard surface 802 of the one or more sealing member retention ribs 800 is a retaining member groove 804 having a diameter D3. It is within the scope of this disclosure and as a non-limiting example that the retaining member groove 804 in the one or more sealing member retention ribs 800 may be less than, substantially equal to or greater than the diameter D1 of the one or more sealing member apertures 578 of the one or more retaining members 548. When the one or more sealing members 546B are inserted within the one or more sealing member apertures 578, the radially outboard surface 802 of the one or more sealing member retention ribs 800 are elastically deformed to allow at least a portion of the one or more retaining members 548 be received and/or retained within at least a portion of the retaining member groove 804. Once disposed within the retaining member groove 804 of the one or more sealing member retention ribs 800, the one or more retaining members 548 are axially retained within the retaining member groove 808 by the radially outboard surface 802 which forms a retention lip 806. It is within the scope of this disclosure and as a non-limiting example that the one or more sealing member retention ribs 800 may be one or more sealing member snap ribs.

By axially retaining the one or more retaining members 548 within the retaining member groove 804 of the one or more sealing member retention ribs 800, it aids in preventing the one or more retaining members 548 from freely floating on the one or more sealing members 546B and pinching or squeezing it against the outer surface 508 of the shaft 504. As a result, the one or more sealing member retention ribs 800 aid in increasing the overall life and durability of the one or more sealing assemblies 502, which reduces the number of warranty claims and reduces the overall costs associated with the one or more sealing assemblies 502.

As illustrated in FIG. 11 of the disclosure and as a non-limiting example, the outermost diameter OD6 of the one or more sealing member retention ribs 800 may be larger than the outermost diameter OD2 of the second end portion of the retaining member sealing surface 614 of the one or more sealing members 546B.

Figure 12:
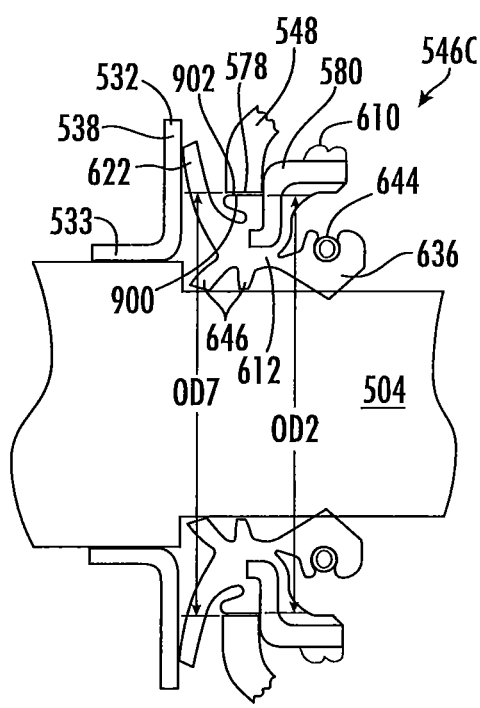
FIG. 12 is a schematic cross-sectional side-view of a portion of the one or more sealing members illustrated in FIGS. 5-11 according to yet another embodiment of the disclosure.

FIG. 12 is a schematic cross-sectional view of a portion of one or more sealing members 546C of the one or more sealing assemblies 502 according to yet another embodiment of the disclosure. The one or more sealing members 546C illustrated in FIG. 12 is the same as the one or more sealing members 546, 546A and 546B illustrated in FIGS. 5-11, except where specifically noted below. As illustrated in FIG. 12 of the disclosure and as a non-limiting example, the one or more sealing members 546C do not include the one or more sealing member retention ribs 628, 700 and 800 illustrated in FIGS. 5-11.

In accordance with the embodiment of the disclosure illustrated in FIG. 12 and as a non-limiting example, the one or more second sealing portions 612 of the one or more sealing members 546C may have one or more sealing member retention ribs 900 circumferentially extending from at least a portion of the outer surface 620 of the retaining member sealing surface 614 of the one or more sealing members 546C. The one or more sealing member retention ribs 900 of the one or more sealing members 546C may have an outermost diameter OD7 that is substantially equal to or larger than the diameter D1 of the one or more sealing member apertures 578 the one or more retaining members 548 of the one or more sealing assemblies 502. When the one or more sealing members 546C are inserted within the one or more sealing member apertures 578, the surface 630 defining the one or more sealing member apertures 578 elastically deforms the one or more sealing member retention ribs 900 thereby providing an amount of frictional force between the one or more sealing members 546C and the one or more retaining members 548. By securing the one or more sealing members 546C within the one or more sealing member apertures 578 of the one or more retaining members 548, it aids in preventing the one or more retaining members 548 from freely floating on the one or more sealing members 546C and pinching or squeezing it against the outer surface 508 of the shaft 504. This aids in increasing the overall life and durability of the one or more sealing assemblies 502. Additionally, this increase in the overall life and durability of the one or more sealing assemblies 502 results in fewer warranty claims, which reduces the overall costs associated with the one or more sealing assemblies 502.

As illustrated in FIG. 12 of the disclosure and as a non-limiting example, the outermost diameter OD7 of the one or more sealing member retention ribs 900 may be substantially equal to the outermost diameter OD2 of the second end portion of the retaining member sealing surface 614 of the one or more sealing members 546C. Additionally, as illustrated in FIG. 12 and as a non-limiting example, a radially outboard surface 902 of the one or more sealing member retention ribs 900 may have a substantially flat or a substantially cylindrical shape. The substantially flat or substantially cylindrical shape of the radially outboard surface 902 of the one or more sealing member retention ribs 900 provide a substantially flat mating surface between the one or more sealing members 546C and the one or more retaining members 548 of the one or more sealing assemblies 502. Additionally, the substantially flat shape of the radially outboard surface 902 of the one or more sealing member retention ribs 900 increases the amount of surface area contact and the frictional engagement between the one or more sealing members 546C and the one or more retaining members 548. This increased surface area contact and frictional engagement aids in retaining the one or more sealing members 546C within the one or more retaining members 548.

It is within the scope of this disclosure that the one or more sealing members 546, 546A, 546B and/or 546C illustrated in FIGS. 5-12 may include one or more of the one or more sealing member retention ribs 628, 700, 800 and/or 900 illustrated in FIGS. 5-12.

It is to be understood that the various embodiments described in this specification and as illustrated in the attached drawings are simply exemplary embodiments illustrating the inventive concepts as defined in the claims. As a result, it is to be understood that the various embodiments described and illustrated may be combined to from the inventive concepts defined in the appended claims.

In accordance with the provisions of the patent statutes, the present invention has been described to represent what is considered to represent the preferred embodiments. However, it should be note that this invention can be practiced in other ways than those specifically illustrated and described without departing from the spirit or scope of this invention.

What is claimed is:

1. A sealing assembly, comprising:
one or more sealing members having a seal casing having a substantially cylindrical portion with a first end portion, a second end portion, an inner surface and an outer surface;
wherein a decreased diameter portion having a first end portion and a second end portion extends radially inboard from at least a portion of said first end portion of said substantially cylindrical portion of said seal casing;
wherein an axially extending portion having a first end portion and a second end portion extends inboard from at least a portion of said second end portion of said decreased diameter portion of said seal casing;
wherein one or more first sealing portions having one or more static sealing ribs circumferentially extend from at least a portion of and are integrally connected to at least a portion of said outer surface of said substantially cylindrical portion of said seal case;
wherein one or more second sealing portions are integrally connected to at least a portion of said decreased diameter portion of said seal casing, said axially extending portion of said seal casing and/or said inner surface of said substantially cylindrical portion of said seal casing;
wherein said one or more second sealing portions of said one or more sealing members comprises a retaining member sealing surface having a first end portion, a second end portion and an outer surface;
wherein one or more sealing member retention ribs circumferentially extend from at least a portion of said outer surface of said retaining member sealing surface of said one or more second sealing portions;
one or more retaining members having an axially outboard surface and an axially inboard surface;
wherein one or more sealing member apertures extend from said axially inboard surface to said axially outboard surface of said one or more retaining members;
wherein said one or more sealing member apertures are oriented about a centerline C1 of said one or more retaining members; and
wherein a surface defining said one or more sealing member apertures in said one or more retaining members elastically deforms at least a portion of said one or more sealing member retention ribs in order to retain at least a portion of said one or more sealing members within said one or more sealing member apertures.

2. The sealing assembly of claim 1, wherein said one or more second sealing portions further comprises one or more first axially extending sealing lips having a first end portion and a second, end portion,
wherein said one or more first axially extending sealing lips circumferentially extend outboard from at least a portion of said first end portion of said retaining member sealing surface; and
wherein said one or more first axially extending sealing lips have an outermost diameter OD2 that is larger than an outer diameter OD1 of said first end portion of said retaining member sealing surface.

3. The sealing assembly of claim 1, wherein said one or more second sealing portions further comprises one or more second axially extending sealing lips;
wherein said one or more second axially extending sealing lips circumferentially extend axially inboard from at least a portion of an inner surface of said one or more second sealing portions of said one or more sealing members;
wherein a spring groove circumferentially extends along at least a portion of an outer surface of said one or more second axially extending sealing lips; and
wherein said spring groove has a size and shape to receive and/or retain at least a portion of a spring member.

4. The sealing assembly of claim 3, wherein said spring member is a garter spring.

5. The sealing assembly of claim 1, wherein said one or more second sealing portions further comprises one or more radially extending sealing lips; and
wherein said one or more radially extending sealing lips circumferentially extend inboard from at least a portion of said inner surface of said one or more second sealing portions of said one or more sealing members.

6. The sealing assembly of claim 1, wherein said seal casing has a substantially chair-shaped cross-sectional shape.

7. The seal assembly of claim 1, wherein said decreased diameter portion is substantially disk-shaped; and
wherein said decreased diameter portion extends radially inboard from and is substantially perpendicular to said substantially cylindrical portion of said seal casing.

8. The seal assembly of claim 1, wherein said axially extending portion of said seal casing has a diameter that decreases from said first end portion to said first end portion of said axially extending portion; and
wherein said diameter of said axially extending portion decreases at a substantially constant rate or a variable rate from said first end portion to said second end portion of said axially extending portion of said seal casing.

9. The sealing assembly of claim 1, further comprising a shaft and a housing;
wherein said housing has a first end portion, a second end portion, an inner surface and an outer surface;
wherein said inner surface and said outer surface of said housing defines a hollow portion therein;
wherein said shaft has a first end portion, a second end portion and an outer surface;
wherein at least a portion of said shaft is disposed within said hollow portion of said housing;
wherein at least a portion of one or more second axially extending sealing lips and/or one or more radially extending sealing lips are sealingly engaged with at least a portion of said outer surface of said shaft; and
wherein at least a portion of said one or more static sealing ribs are sealingly engaged with at least a portion of said inner surface of said first end portion of said housing.

10. The sealing assembly of claim 9, wherein said shaft is an axle half shaft.

11. The sealing assembly of claim 1,
wherein at least a portion of said one or more retaining members are integrally connected to at least a portion of said first end portion of said housing.

12. The sealing assembly of claim 1, wherein said one or more sealing member retention ribs have an outermost diameter OD4 that is substantially equal to or larger than a diameter D1 of said one or more sealing member apertures of said one or more retaining members; and
wherein a radially outboard surface of said one or more sealing member retention ribs has an under-cut portion.

13. The sealing assembly of claim 12, wherein said under-cut portion of said one or more sealing member retention ribs have a substantially flat shape.

14. The sealing assembly of claim 1, wherein said one or more sealing member retention ribs have an outermost surface having a substantially spherical shape with a radius of curvature R1;
wherein said one or more sealing member retention ribs have an outermost diameter OD5 that is substantially equal to or larger than said diameter D1 of said one or more sealing member apertures of said one or more retaining members; and
wherein said surface defining said one or more sealing member apertures in said one or more retaining members elastically deforms at least a portion of said substantially spherical outermost surface of said one or more sealing member retention ribs in order to retain at least a portion of said one or more one or more sealing members within said one or more sealing member apertures.

15. The sealing assembly of claim 1, wherein said one or more sealing member retention ribs have a retaining member groove;
wherein said retaining member groove circumferentially extends along at least a portion of a radially outboard surface of said one or more sealing member retention ribs;
wherein said retaining member groove has a size and shape to receive and/or retain at least a portion of said one or more retaining members;
wherein said surface defining said one or more sealing member apertures in said one or more retaining members elastically deforms at least a portion of a retention lip of said retaining member groove in said one or more sealing member retention ribs in order to retain at least a portion of said one or more retaining members within said retaining member groove of said one or more sealing member retention ribs.

16. The sealing assembly of claim 1, wherein said one or more sealing member retention ribs have a radially outboard surface that is substantially flat or substantially cylindrical in shape;
wherein said substantially flat or substantially cylindrical radially outboard surface of said one or more sealing member retention ribs have an outermost diameter OD7 that is substantially equal to or larger than said diameter D1 of said one or more sealing member apertures of said one or more retaining members; and
wherein said surface defining said one or more sealing member apertures in said one or more retaining members elastically deforms at least a portion of said substantially flat or substantially cylindrical radially outboard surface of said one or more sealing member retention ribs in order to retain at least a portion of said one or more one or more sealing members within said one or more sealing member apertures.

17. The sealing assembly of claim 9, further comprising a slinger having a substantially cylindrical portion with an inner surface and an outer surface;
wherein at least a portion of said inner surface of said substantially cylindrical portion of said slinger is integrally connected to at least a portion of said outer surface of said shaft;
wherein increased diameter portion having a first side and a second side circumferentially extends outboard from at least a portion of said outer surface of said substantially cylindrical portion of said slinger; and
wherein at least a portion of a first end portion of one or more first axially extending sealing lips of said one or more sealing members are in direct contact with and sealingly engaged with at least a portion of said second side of said increased diameter portion of said slinger.

18. The sealing assembly of claim 1, further comprising one or more bearing assemblies having one or more sealing member contact portions;
wherein at least a portion of said second end portion of said substantially cylindrical portion of said seal casing of said one or more sealing members is in direct contact with at least a portion of said one or more sealing member contact portions of said one or more dealing assemblies; and
wherein said substantially cylindrical portion of said seal casing of said one or more sealing members apply a-an amount of pre-loading force onto said one or more bearing assemblies.

* * * * *